United States Patent [19]

Werner

[11] 3,878,513

[45] Apr. 15, 1975

[54] DATA PROCESSING METHOD AND APPARATUS USING OCCUPANCY INDICATIONS TO RESERVE STORAGE SPACE FOR A STACK

[75] Inventor: John R. Werner, Glendora, Calif.

[73] Assignee: Burroughs Corporation, Detroit, Mich.

[22] Filed: Feb. 8, 1972

[21] Appl. No.: 224,435

[52] U.S. Cl. .......... 340/172.5

[51] Int. Cl. .......... G06f 7/00; G06f 13/00

[58] Field of Search .......... 340/172.5; 444/1

[56] References Cited

UNITED STATES PATENTS

| | | | |
|---|---|---|---|
| 3,416,138 | 12/1968 | Brass | 340/172.5 |
| 3,573,750 | 4/1971 | Ishidate | 340/172.5 |
| 3,588,839 | 6/1971 | Beledy et al. | 340/172.5 |
| 3,594,732 | 7/1971 | Mendelson et al. | 340/172.5 |
| 3,629,587 | 12/1971 | Faber | 340/172.5 |
| 3,670,307 | 6/1972 | Arnold et al. | 340/172.5 |
| 3,670,309 | 6/1972 | Amdahl et al. | 340/172.5 |
| 3,675,217 | 7/1972 | Dauber et al. | 340/172.5 |

OTHER PUBLICATIONS

Scarrott, G. G., Information Processing, Vol. 1, 1965, pp. 137–141. (L-7140-1245)

*Primary Examiner*—Harvey E. Springborn
*Assistant Examiner*—Michael Sachs
*Attorney, Agent, or Firm*—Christie, Parker & Hale

[57] ABSTRACT

While executing program code arranged in nested blocks, a data processing system accumulates words in a stack storage means comprising a pair of registers coupled to an arithmetic unit and supplying thereto operands for processing; a plurality of memory locations in a relatively large-capacity, low-speed memory; and a relatively small-capacity, high-speed memory having a plurality of addressable extension locations. Register means are set to associate the extension locations in one-to-one correspondence with a group of memory locations so as to define corresponding pairs of locations. Each pair is reserved for storing a different stack word and has four occupancy conditions. Before the actual accumulation of the stack word for which the pair is reserved, the pair is in a first condition wherein both locations of the pair are unoccupied. After actual accumulation, the pair is either in a second condition wherein only the extension is occupied, or in a third condition wherein only the memory location is occupied, or in a fourth condition wherein both locations are occupied. Preferably each extension location has occupied and copy indicating storage cells having four states each indicating one of the four possible conditions. Stack words forming the record of execution of a first program block are initially accumulated in the extension locations. When a second program block nested within the first program block is entered the record of execution of the first block is transferred to the presently corresponding memory locations and then the associating register means is set to associate the extension registers with a different group of memory locations so that the extension locations are available to store stack words for the second block. The stack includes a linked list of control words containing stack depth information indicating the number of stack words accumulated in executing each block. Upon a transfer of control from the second block back to the first block the stack depth information is used to set the associating register means so that the required number of extension locations are again reserved for storing the previously accumulated record of execution of the first block. Instead of indiscriminately transferring the record of execution of the first block back to such reserved extension locations, the occupancy and copy indicating storage cells for each such reserved extension location are set to indicate that only the respective memory location is occupied. Thus upon a further transfer of control to another block, the occupancy and copy indicating storage cells provide information used to eliminate unnecessary transfers of words to memory locations already storing the proper words.

18 Claims, 14 Drawing Figures

FIG. 4A, FIG. 4B, FIG. 4C

FIG. 4, FIG. 4A (BEFORE MKS), FIG. 4B (AFTER ENTER), FIG. 4C (AFTER EXIT)

DATA PROCESSING METHOD AND APPARATUS USING OCCUPANCY INDICATIONS TO RESERVE STORAGE SPACE FOR A STACK

CROSS-REFERENCE TO A RELATED APPLICATION

A related patent applicaation entitled DATA PROCESSOR HAVING AN ADDRESSABLE LOCAL MEMORY LINKED TO A MEMORY STACK AS AN EXTENSION THEREOF, by Erwin A. Hauck and assigned to the assignee of this invention, bearing Ser. No. 224,420, filed Feb. 8, 1972 has issued as U.S. Pat. No. 3,725,876. This related patent is directed to a data processing system wherein the storage of information items is allocated between a main stack storing memory and a local stack extension memory such that parameters and variables local to a currently executing program block are captured in the stack extension memory where they can be selectively read out quickly and repeatedly. The related patent discloses means operative upon entry from an old program block into a new program block for allocating the stack extension memory to the storage of a stack for the new block and for transferring a stack for the old program block from the stack extension memory to the main stack storing memory.

The present invention is directed to an improved method and apparatus for an addressable stack extension memory wherein the allocation of storing information items is controlled by an occupancy indication and the invention provides for updating the occupancy indication upon exit from one program block into another program block.

BACKGROUND OF THE INVENTION

1. Field of the Invention

This invention relates to data processing system methods and apparatus and, particularly to stack organized data processing.

2. Description of the Prior Art

A machine language program for a data processing system comprises executable program operators for causing a data processor to process input data in a series of steps. During the execution of a program, information items in the nature of intermediate results are produced. Such information items are temporarily stored in a memory until they are needed in a subsequent step. In many data processing applications, these information items are needed in an order reversed from the order in which they were produced. Thus the information items are written into the memory and then read from the memory on a last-in, first-out (LIFO) basis. The task of storing such information items involves certain sub-tasks. For example, memory space must be allocated for storing such information items and then de-allocated after they are no longer needed. Also, the information items must be stored in such a way that the data processor will know where to find them when they are needed.

Prior art data processors have included apparatus, commonly called a stack mechanism, for facilitating this task. A stack mechanism accumulates the information items in a memory in the form of a linear list called a memory stack. As information items which must be saved for later use are produced, the stack mechanism writes such information items into the memory by what are called push-down operations. When an information item is needed, the stack mechanism reads it from the memory by what is called a pop-up operation. Each push-down operation causes an information item to be added to the memory stack or, equivalently, to increase the total of accumulated information items. Each pop-up operation causes an information item to be removed from the memory stack or, equivalently, to decrease the total of accumulated information items. Thus the memory stack expands as a result of push-down operations and contracts as a result of pop-up operations.

A memory stack has a top of memory stack information item. This is the information item which was added to the memory stack by the last or, equivalently, the most recent push-down operation and which has not yet been removed from the memory stack by a pop-up operation. A stack mechanism includes means for keeping track of where the top of stack information resides. Typically, a stack mechanism includes an address register for this purpose. This address register stores a pointer which points to a memory location which contains the information item at the top of the memory stack. The noun "pointer" and the verb "points" are useful items, which will be used in this application. The term "pointer" subsumes the terms absolute address, relative address, and indirect address. Thus a pointer is a coded signal identifying a desired location. A pointer is said to "point" to a desired location. These terms are useful because they express a concept in a way which subordinates unimportant detail. Consider for example a situation in which the top of memory stack information item is a double precision word and occupies two successive memory locations. In this situation, it would be imprecise to say that the abovementioned address register stores the address of the location storing the top of stack information item.

A stack can be built up from different kinds of information items. The stack can consist entirely of operands, entirely of control words, or a mixture of operands and control words. When the stack consists entirely of operands, the stack is called an operand stack. An operand stack is built up on a pure LIFO basis. That is, the operands in the stack can be brought out of the memory only in an order reversed from the order in which they were brought in. In other words, there is no random access addressing means by which the programmer can order operands to be brought out of the operand stack in a different order. Since the memory stack operands cannot be addressed by the programmer they are said to be invisible to the programmer. The memory means which stores an operand stack typically comprises first and second high speed registers within a data processor and a part of a main memory. A stack mechanism that is used in connection with an operand stack typically comprises means for linking these two high speed registers to the memory stack so that they form the top two available locations of the stack storage means and a part of the control unit of the processor which produces control signals for causing operands in the stack to be popped-up and pushed-down. This linkage is accomplished by providing an occupancy-indicating flip-flop for each of the two high speed registers and a stack pointer register. The stack pointer register stores an indication of the main memory location storing the top of memory stack operand. Each occupany flip-flop stores an indication of whether or not there is a valid operand in its associated register.

An operand stack is particularly suited to facilitate ıe computation of equations that are expressed in Pol-.h notation. Such equations are parenthesis free and onsist of a string of operands and operators. A con-ention is established whereby each arithmetic opera-›r operates on two immediately preceding operands. 'onsider, for example, the Polish notation string *a b c* ·*x*. The two operands preceding the plus sign are b and and therefore the plus sign indicates that b and c are › be combined to form a single new operand $(b + c)$. low the two operands preceding the multiply sign be-ome $(b + c)$ and *a*. Therefore the multiply sign indi-ates that the two operands *a* and $(b + c)$ are to be com-ined to form a single new operand $(a)x(b+c)$. Each ıme a pair of operands are operated upon or combined › form a new single operand they are said to be "di-ested."

A program for the exemplary Polish notation string iven above and the response thereto of a prior art pro-essor is as follows. A program operator orders the pro-essor to fetch the operand *a* from an indicated loca-ion of the memory and to place *a* at the top of the tack. The stack mechanism responds to adjust the tack down. In adjusting the stack down the stack nechanism checks the first occupancy-indicating flip-lop. If it is indicated that a valid operand is stored herein the contents of the second register is pushed lown into the memory stack and then replaced by the :ontents of the first register. After the stack has been ıdjusted down the first register is unoccupied and is herefore available to store the operand *a*. Then the op-:rand a is fetched from memory and stored into the irst register. Simultaneously, the first occupancy flip-lop is set to indicate that the first register contains a ,alid operand. A second and third program operator :hen orders the processor to place the operands b and : respectively at the top of the stack, and the processor ·esponds as described above.

At this point the operand *a* is now the top of memory ;tack operand; the operand *b* is stored in the second ·egister; and the operand *c* is the top of stack operand ınd is stored in the first register. Next a program opera-:or orders an add operation. The processor responds to :ouple the contents of the first and second registers to :he arithmetic unit which sums the *b* and *c* operands to ›roduce the single operand $(b + c)$ and stores this sum ›ack into the second register. Simultaneously the first ›ccupancy flip-flop is reset to indicate that the first reg-ister does not contain a valid operand. This is done be-:ause the two operands b and c previously occupying the first and second registers have been combined into a single operand now occupying only the second regis-ter and the first register is unoccupied. Next, a program operator orders a multiply operation. The stack mecha-nism responds to adjust the stack up. In adjusting the stack up the stack mechanism checks the first occupan-cy-indicating flip-flop and finds that no valid operand is stored in the first register. Therefore, the contents of the second register $(b + c)$ are transferred to the first register and the operand at the top of memory stack (operand *a*) is retrieved from memory and stored into the second register. The processor then couples the contents of the first and second registers to the arith-metic unit which produces the product $(a)x(b+c)$ and stores this product back into the second register. A dig-ital processor which operates in accordance with the foregoing is described in U.S. Pat. No. 3,200,379.

The above-described example illustrates one of two related problems that arise in stacking words. Both of these problems stem from the fact that a significant amount of time is required for main memory accesses and this time is quite large compared to the time required for a register to register transfer. Two factors affect this relative access time. Firstly, main memory is generally constructed from magnetic core elements which are inherently slower than the circuit elements within the processor. Secondly, main memory is generally shared by a plurality of requesting units such as other data processors, input/output controllers, and the like. Such sharing of main memory leads to queuing of requests. In contrast, an intraprocessor transfer is independent of other units in the system. Since the transfer of information back and forth between main memory and the processor takes a relatively large amount of time, the system throughput is adversely affected by repeated main memory accesses. The adverse effect of the first problem is measured in terms of what is called stack adjustment overhead. Note that in the above-described example the processor read out the operand a from main memory, did nothing of significance with it, stored it back into main memory, and subsequently read it out again for use in connection with the multiply operation. Thus three main memory accesses were involved before the operand a was actually combined with the operand $(b + c)$. Such repeated main memory accesses are time consuming and serously affect the computing power of the machine.

The related problem of repeated main memory accesses does not directly involve pop-up, push-down operations of a LIFO memory. This problem arises in connection with obtaining information from indicated locations of the main memory for placement in the stack. To understand this problem consider first an over-simplified example of the computation of $a^3$. In Polish notation $a^3$ is expressed as aaaxx. A program for this Polish notation string could make three consecutive main memory accesses to fetch the same variable for placing the variable at the top of the stack three consecutive times. Then two multiply operators would cause the three operands to be combined to form $a^3$. This related problem is manifested whenever the same operand must be brought to the top of the stack several different times during the execution of a program string. This related problem becomes especially aggravated when the location of the desired operand is indicated by an indirect address. An indirect address is an address that specifies a location whose contents is either an address or another indirect address. The contents of the specified location are used to obtain the actual operand. Thus a chain of main memory accesses may be necessary to obtain a single desired operand for placement in the stack.

In an attempt to minimize the number of main memory accesses and thereby increase processing speeds, prior art data processors have included high speed local memories. Such local memories have less storage capacity than the main memory because in general the cost and access time of a memory increases in proportion to its storage capacity. In systems which include a main memory and a data processor having a local memory, some means must be provided for allocating between the two memories the storage of information items. The allocation means must decide what information should be stored in the local memory and what information should be stored in the main memory; it must decide when to store information in the local memory and when to store information in the main memory; and it must decide when to replace information in the local memory with information from the main memory.

Consider an approach taken in the prior art to alleviate the stack adjustment overhead problem discussed above by employing a local memory in the data processor. The approach is disclosed in U.S. Pat. No. 3,401,376 by G. H. Barnes et al entitled CENTRAL PROCESSOR and assigned to the assignee of this invention. The Barnes et al patent discloses a data processor which includes the usual pair of high speed registers and additionally includes 12 other high speed registers that operate as an operand stack extension. In this machine the stack is adjusted down by pushing the operands out of the pair of high speed registers down into the stack extension instead of writing them into the main memory immediately. Also the stack is adjusted up by popping up operands from the stack extension instead of reading them out from the top of the stack in main memory. The last operand pushed down into the stack extension is always the first word popped up into the pair of high speed registers. As is typical with an operand stack, the operands stored in this stack extension are "invisible" to the programmer. Although this stack extension is a pure LIFO memory with respect to operand transfers between it and the pair of high speed registers, it operates on a first-in first-out (FIFO) basis with respect to transfers of operands that pass through the stack extension to the main memory. This is because the operands at the bottom of the stack extension are pushed out of the bottom of the stack extension into the operand stack in the main memory when it becomes necessary to make space available in the stack extension for storage of more operands. Thus as a series of operands are pushed down into the stack extension the first operand moves down through the stack extension and after the stack extension is full the first operand is the first of the series to be pushed down into the stack in main memory.

The means for linking this stack extension to the main memory stack comprises a top pointer, a bottom pointer, a detector for detecting predetermined differences between the top and bottom pointers, and a main memory stack location pointer. The top pointer identifies the register storing the top word in the stack extension. The bottom pointer identifies the register storing the bottom word in the stack extension. In use, all of the registers including and between the two identified registers store operands and are said to be occupied. Therefore, the differences between the top and bottom pointers provide an indication of the extent to which the stack extension memory, as a whole, is occupied. When the difference detector senses that the stack extension memory is full it actuates circuitry which transfers the bottom four words of the stack extension over to the main memory stack in accordance with address information provided by the main memory stack location pointer. Also, when the difference detector senses that the stack extension is nearly empty it actuates circuitry which transfers to the bottom of the stack extension four words from the main memory stack. Thus the stack extension always contains the top words in the stack.

A second type of stack consisting entirely of control words has been used to link different parts of a program together. Frequently in the execution of a program it becomes necessary for a first procedure to initiate the execution of (call) a second procedure. When such a call occurs it is necessary to remember the point in the first procedure where the processor should return at the completion of the second procedure. Furthermore, a called procedure can itself call a different procedure and therefore it is necessary to remember a plurality of return points. Thus a stack for storing a plurality of return points can be called a subroutine control stack.

A third type of stack consisting of a mixture of operands and control words is disclosed in U.S. Pat. No. 3,153,225 by J. N. Merner et al, entitled DATA PROCESSOR WITH IMPROVED SUBROUTINE CONTROL and assigned to the assignee of this invention. The data processor of this patent includes means for inserting control words into the stack as well as operands so as to mark off areas of the stack that are related to particular subroutines. The insertion of these control words into the stack serves several functions. One function is to provide subroutine linkage information by creating a linked list denoting the stack history. The stack history list is a record of the actual sequential order in which the program entered different levels. Another function is to provide base addresses for relative addressing within the stack. During subroutine execution a program operator can call on or obtain a parameter that is stored within the stack even though the parameter cannot be popped up immediately because it was not the last item pushed down into the stack. Thus this type of stack is not a pure LIFO stack, and the words within the stack are considered to be "visible" to the programmer.

An advantage arises from the provision of means for addressing within a stack and rendering the words therein visible. That is that once an information item has been placed in the stack it can be brought to the top of the stack again without using indirect addressing techniques and the attendant multiplicity of main memory accesses.

U.S. Pat. No. 3,461,435 by R. S. Barton et al, entitled STACK MECHANISM HAVING MULTIPLE DISPLAY REGISTERS and assigned to the assignee of this invention, also discloses a stack mechanism that stores in a single stack both operands and subroutine control information. The data processor disclosed in this patent discloses improved apparatus for addressing within a stack. The processor has a plurality of display registers each of which stores an address of a control word which marks the stack. Each stored address is a base address for base relative addressing within the stack. All of the base addresses for the current procedural addressing environment are made visible by the display registers.

U.S. Pat. No. 3,548,384 entitled PROCEDURE ENTRY FOR A DATA PROCESSOR EMPLOYING A STACK and assigned to the assignee of this invention, is directed to the method and means by which the above-mentioned display registers are updated. This patent describes in detail how the information contained within the control words in the stack can be used in the execution of programs expressed in ALGOL-like languages.

A program written in ALGOL is arranged in blocks. A block comprises one or more statements that order certain actions; declarations of identifiers; and the statements BEGIN and END, which mark the boundaries of the block.

One purpose of a block is to introduce a new level of nomenclature by means of the declarations of identifiers. A new level of nomenclature is introduced by nesting one block within another block. Such nested blocks are related to each other as local and global blocks. Under the ALGOL rules an identifier can have the same meaning within a local block as it has within its global block. On the other hand, the same identifier has completely different meanings within the nested blocks when the identifier is redeclared within the local block. This is a powerful feature of the ALGOL language because it permits a programmer to use convenient, suggestive identifiers within the block he is writing without fear that he may be inadvertently affecting some other block.

Before a program written in ALGOL is executed, it is translated into machine code by another program called a compiler. The machine code comprises a plurality of program operators or instructions. The program code produced by the compiler is used to control the processing of data. It is advantageous to make the program code independent of the data in the sense that the program code is not modified during the time it controls the processing of data. Since the program code is not modified while controlling the processing of one set of data it can be used again for controlling the processing of a different set of data in the same manner. This feature is called re-entrant coding and is a powerful tool in a multiprocessing machine.

The prior art computing machine described in U.S. Pat. No. 3,548,384 has features which facilitate the execution of programs having a block structure. Its instruction preparatory includes program operators having functions which closely resemble the functions of the BEGIN and END statements of ALGOL. It includes a stack mechanism for building a stack representing the record of execution of a block. Each block storage area of a stack has a Mark Stack Control Word (MSCW) which is located at its beginning or base and which serves to identify the particular block storage area. A Return Control Word (RCW) is located in the next location above each MSCW. The RCW contains information that is used upon completion of execution of the program block. For procedural blocks, the successive locations of the stack upwardly from the RCW contain parameters that have been passed to the procedure. In addition, references to variables and procedures that have been declared local to the block are stored above the RCW. Parameters are located in the stack by a lexicographical level value (*ll*) plus an increment value ($\delta$). The lexicographical level selects one of the display registers and the absolute address in the display register is added to the increment value to give the main memory address of the desired parameters.

In the related patent application entitled DATA PROCESSOR HAVING AN ADDRESSABLE LOCAL MEMORY LINKED TO A MEMORY STACK AS AN EXTENSION THEREOF, cross-referenced above, there is disclosed an improved stack organization that stores parameters in a high speed addressable memory which is linked to a main stack storing memory to form a stack extension memory. An object of this improved stack organization is to allocate the storage of information items between the main memory and the stack extension memory such that those information items that are currently needed for processing are stored in the stack extension memory. Two features of this stack extension memory contrast with prior art stack extensions. One, information items are not pushed down out of the bottom of this stack extension into the main memory stack but instead are captured during the execution of a program block. Two, the stack extension memory is addressable and captured information items are made visible. That is, a program operator can order a captured information item to be read from a selected location and be brought to the top of the stack.

Consider now how these two features attain the above-mentioned object. A program having a block structure contains program operators indicating the boundaries of each block. A block can be nested as a local block within a global block. Execution of such a program can proceed in stages wherein the program enters the global block; then enters the local block before completing the execution of the global block; then exits or returns from the local block to the global block; and then completes the execution of the global block. Thus the block which the processor is currently executing changes from the global block to the local block and then changes back to the global block. Each block has its own local variables which will be referred to during its execution. A block which is a procedural block will in addition have parameters passed to it from a calling block and these parameters will be referred to during the execution of the procedural block. Upon entry into a block, information items such as parameters and local variables are written into the stack extension memory. Since these information items will be needed during execution of the entered block, it is advantageous to store them in the higher speed extension memory. During the execution of the entered block a stack is built up in the stack extension memory but the parameters and variables are not pushed down out of the bottom of the stack extension memory as in the prior art, and instead are captured while the block is being executed. Since the stack extension memory is addressable, the parameters and variables can be referred to as needed and can be brought to the top of the stack in any desired order. As each new block is entered, the stack extension memory is flushed out so that it will be available for storing a stack for the new block. This flushing is in the nature of an overlay wherein accumulated information items are transferred to the main stack storing memory. Thus it can be seen that information items are not permanently captured in the stack extension memory. Instead the stack extension memory captures them only during the stage in which they are most frequently needed for processing and the stack extension memory is updated each time a new block is entered. Although main memory accesses are still required for bringing information items into the stack extension memory and for flushing out the stack extension, a substantial number of main memory accesses are saved in stack adjustment operations and in bringing parameters and local variables to the top of the stack.

The present invention provides a further improvement in allocating the storage of information items between a stack extension memory and a main stack storing memory. It is an object of this invention to reduce further the number of main memory accesses in executing a program and in particular to eliminate some of the main memory accesses which are involved in obtaining information items from the main stack storing memory for writing into the stack extension memory.

SUMMARY OF THE INVENTION

The present invention is directed to an improved method and apparatus for allocating the storage of information items between a main stack storing memory and a stack extension memory.

A data processing system embodying the present invention includes memory means comprising an addressable main memory and an addressable stack extension memory; a plurality of occupancy indicating means, each associated with a different address of the stack extension memory and each indicating whether its associated address stores an information item of a stack; and means for accumulating in the memory means information items which must be saved for later use and for retrieving an accumulated information item when needed either from the stack extension memory or from the main memory in accordance with an indication provided by the occupancy indicating means. The invention provides a stack mechanism for writing information items into the stack extension memory and for reading them out on a last-in, first-out basis whereby a stack of information items is accumulated. The invention also provides a means for reading out some other information item within the stack in addition to the last information item added to the stack.

A feature of the present invention resides in the storing within the stack extension memory of information items which can be referred to in a program block building the stack and the setting of the occupancy indicating means to indicate that such information items can be read out of the stack extension memory and that a time consuming main memory access is unnecessary.

Another feature of the present invention resides in the selective manner in which information items are written into the stack extension memory. As in the system of the above-mentioned related application the contents of the stack extension memory are updated on each entry into a new program block by writing into the stack extension memory the parameters and local variables for the new program block. In contrast, however, the present invention provides for the elimination of main memory accesses involved in updating the contents of the stack extension memory upon leaving (exit from) a program block. For example, upon an exit from a local block back to a previously entered global block, the stack which has already been accumulated for the global block is not automatically written into the stack extension memory. Instead, the present invention provides for temporarily reserving space in the stack extension memory for the global stack. Each address of the stack extension memory so reserved has its occupancy indicating means reset to indicate that it does not actually store a valid information item. In the event that such information is needed in the first stages of executing the global block a main memory access can be made to obtain it. On the other hand, in the event that such information item is not so needed at least one and possibly two main memory accesses are eliminated depending upon whether the program next exits the global block or next enters another local block.

A preferred embodiment of the present invention includes a plurality of copy indicating means, each associated with a different stack extension memory address and each indicating whether an information item stored in the associated address is a copy of an information item stored in the main memory stack. In this preferred embodiment, the flushing of the stack extension upon entry into a program block involves inspection of the copy indicating means and the elimination of main memory write accesses for those information items which are copies.

A feature of the preferred embodiment resides in reserving space in the stack extension memory for a stack, selectively reading an information item from a stack in the main memory, writing the information unit into the stack extension memory and setting the copy indicating means.

Another feature of this invention resides in the novel manner in which a stack history list is used to allocate locations of the stack extension memory. The stack history list is made up from a linked list of control words which make the beginning of stack areas storing stacks for the different program blocks. The mark words contain a difference value pointing to a preceding mark word and indicating the depth of the preceding stack. As each block is exited, this difference value is obtained and supplied to address modifying means which in turn produces a pointer to a new top location of the stack extension memory. All of the locations below the new top location are reserved.

A method in accordance with the present invention comprises the steps of accumulating as a stack in the stack extension memory a plurality of words during the execution of a block of push-down and pop-up operations and simultaneously updating a pointer to the top of stack word; marking the locations of the stack extension memory to indicate such locations are occupied; detecting an entry into a different block, and responsive thereto, flushing the stack extension; accumulating, updating and marking as above for the different block; detecting an exit back to the original block, and responsive thereto, marking the locations of the stack extension memory and setting the pointer to point to the location of the stack extension which had stored the top of stack word for the original block when the program entered the different block.

DESCRIPTION OF THE PREFERRED EMBODIMENT

General Description

Figure 1:
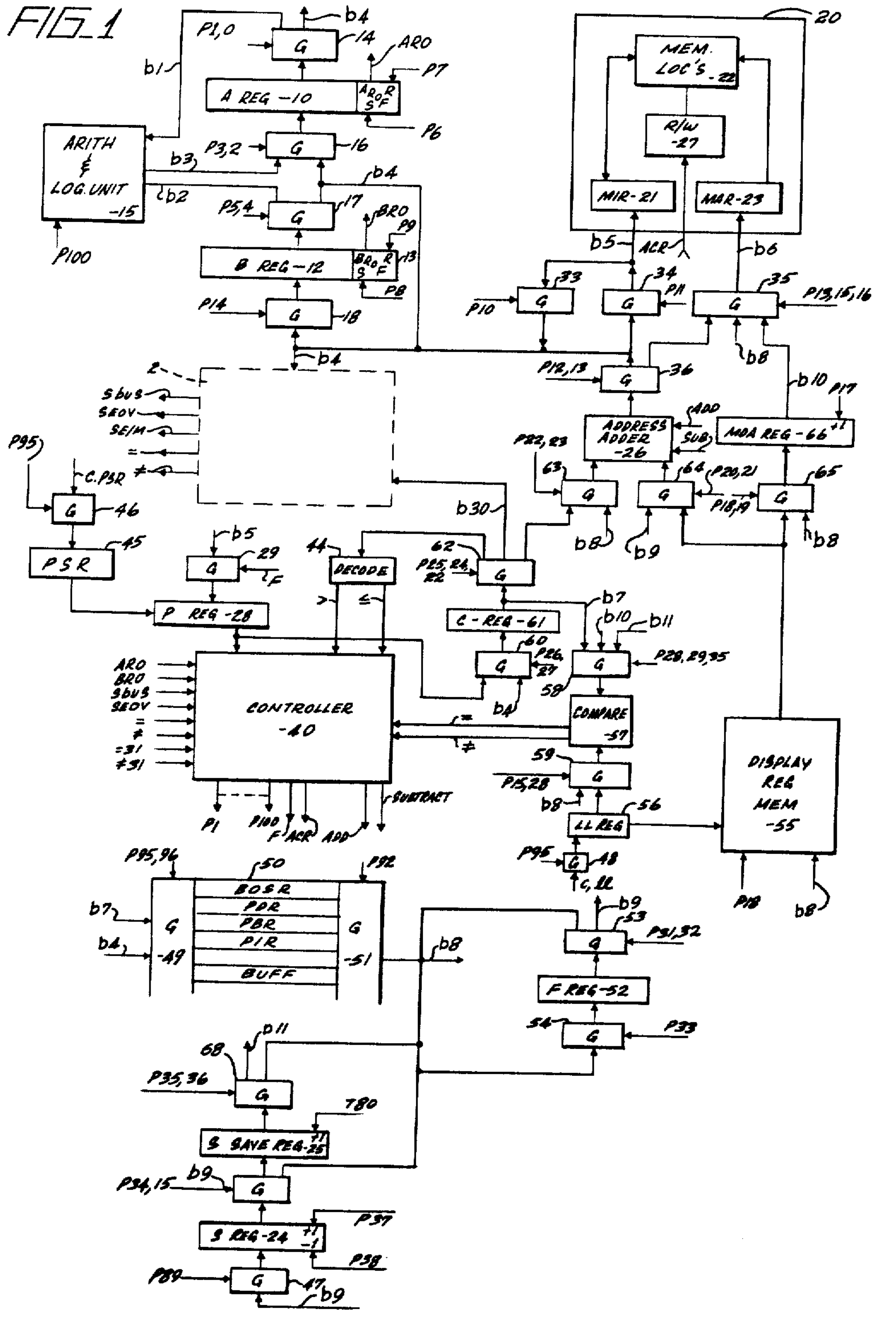
FIG. 1 is an overall block diagram of a data processing system having a stack extension memory and embodying the present invention.
Figure 2:
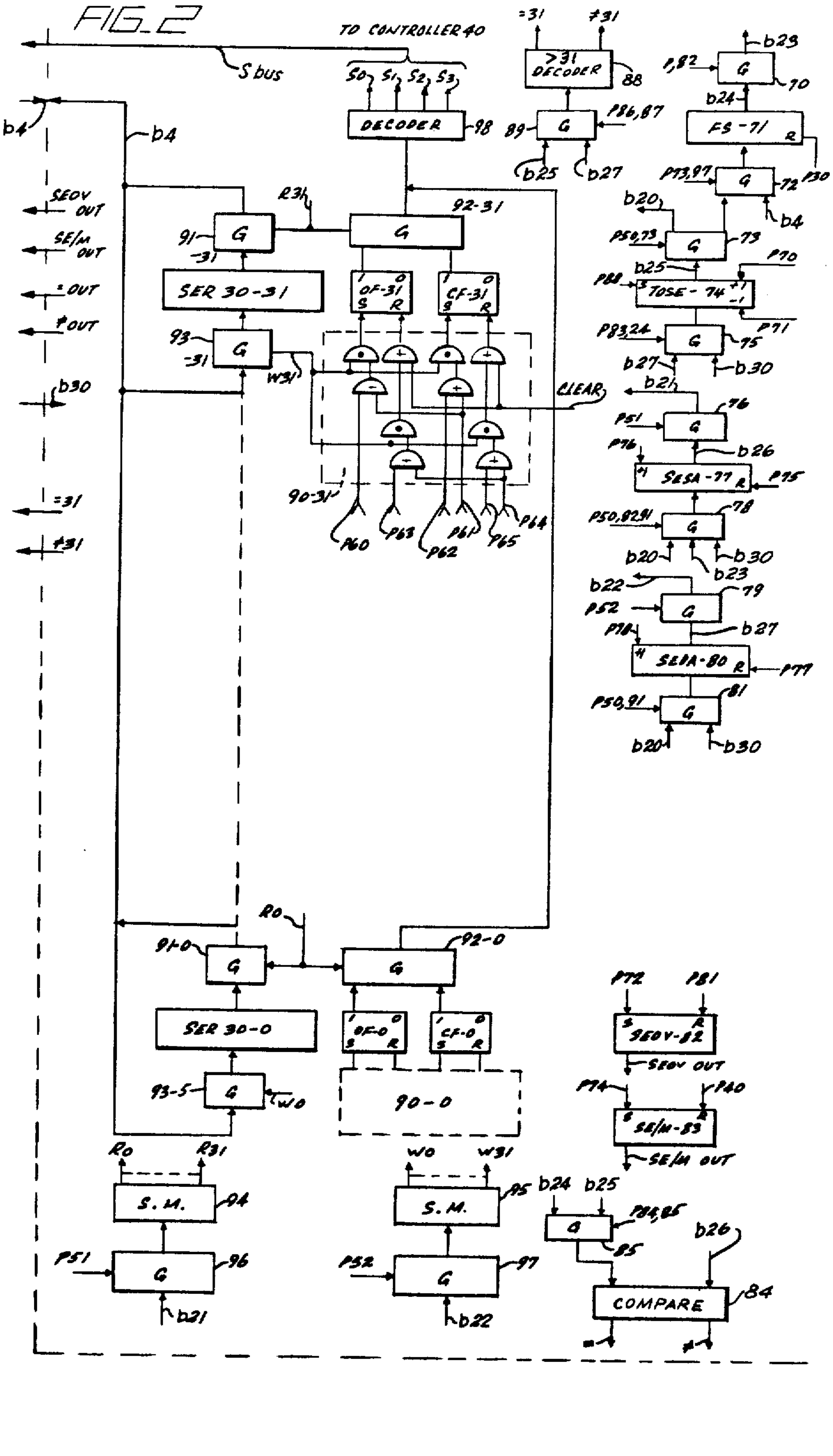
FIG. 2 is a block diagram of block 2 of FIG. 1 and shows the details of the stack extension memory and its associated circuitry.
Figure 3:
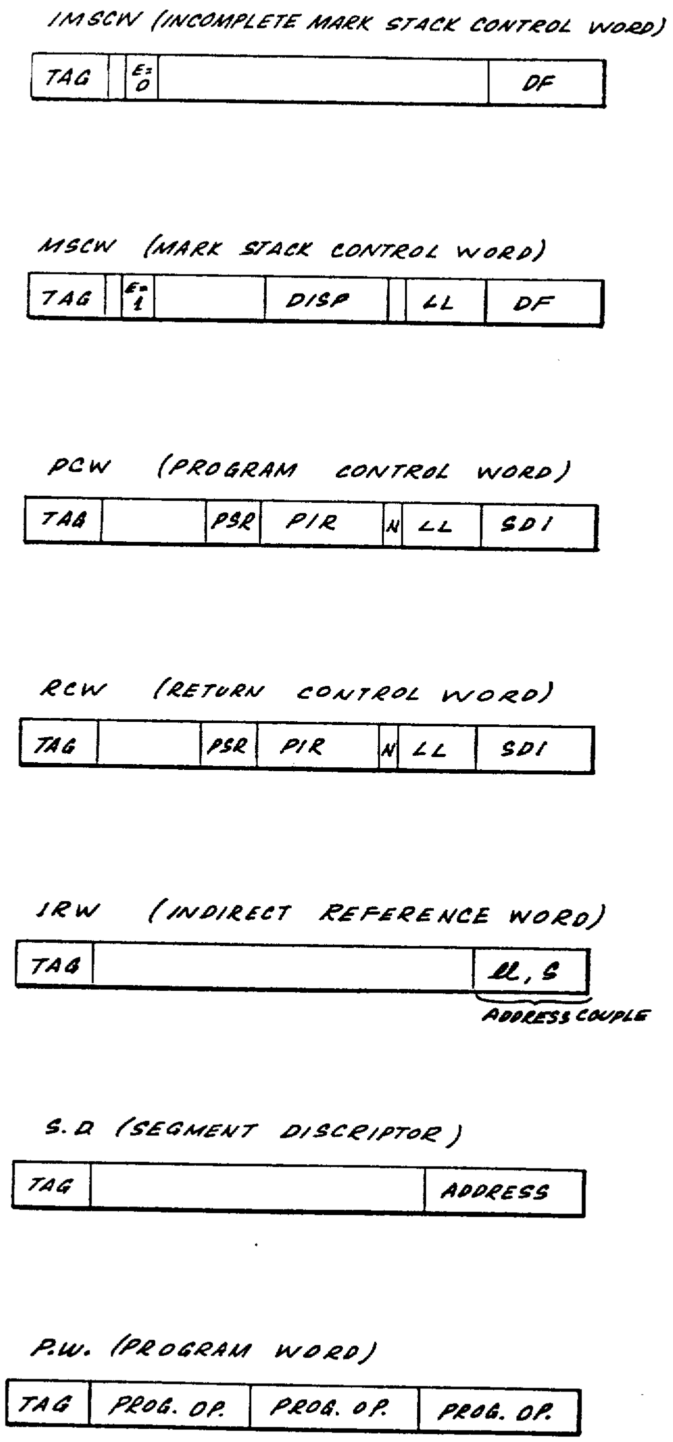
FIG. 3 is a sketch showing the format of various types of words stored in a stack.

Before considering the details of the construction and operation of the preferred embodiment of the data processing system, consider first the general functions of its major components in connection with the block diagrams of FIGS. 1 and 2, and the format of the different types of words shown in FIG. 3.

A memory shown at 20 has a plurality of memory locations 22 and stores programs comprising executable strings of program operators; input data to be processed; output data; and in addition, stores some of the intermediate results of processing in the form of a stack.

A stack organized data processor shown generally throughout the rest of FIG. 1 processes data under control of the program strings. To that end, the processor includes a register for storing program operators during their execution (P register 28), an arithmetic and logical unit (AL15), and a conventional timing and control unit (controller 40) which forms control signals to control the sequencing of micro-operations involved in executing program operators.

The AL15 performs various arithmetic and logical operaions such as adding, subtracting, and the like in a manner well known in the computer art. A tutorial treatment of the construction and operation of a computer arithmetic and logical unit is given in a textbook entitled "Digital Computer Design Fundamentals," by Y. Chu, published by the McGraw Hill Book Company, Inc. in 1962. The pertinent pages of this textbook are pages 363–368 and pages 430–444.

A plurality of buses couple the data processor to memory 20. Bus b6 carries address signals which identify selected locations within memory 20; bus b5 carries information to be written into selected locations during write operations and carries information read out of selected locations during read operations; and bus ACR carries control signals to initiate memory accesses and indicate whether a read or a write cycle should be executed.

Display register memory 55 comprises a plurality of display registers DO-DN (not individually shown) identical in structure and function to the display registers described in above-mentioned U.S. Pat. No. 3,548,384. Thus, display register 1 (D[1]) stores the base address of an array stored in memory 20. This array is called a segment dictionary and comprises a plurality of segment descriptors. The format of a segment descriptor is shown in FIG. 3. A segment descriptor points to a location in memory 20 wherein the beginning of a code segment for a program block is stored.

Consider briefly the manner in which program code is read out of memory 20. The program code is partitioned into program segments. Each program segment has a base address and comprises a plurality of program operators which are addressable relative to its base address. The program operators have variable field length and are frequently packed together within a single location of memory 20. The segmentation of the program code is tied into the block structure of higher level languages. Thus an execution of the program changes from one block to another, there is a transfer of control from one program segment to another.

The display register D[1] a program dictionary register (PDR), a program base register (PBR), a program index register (PIR), and a program syllable register (PSR) (see 45 and 50) combine to form a means for pointing to the program operator to be executed. The program pointing means employs the techniques of indirect addressing and relative addressing. To that end, an address adder 26 is provided for forming absolute addresses of memory 20 from a base address and an index.

As a preliminary matter, indirect addressing is used to locate the base address of a program segment. To that end, a segment descriptor is read out of memory 20 from an address calculated by address adder 26. The segment descriptor includes a field pointing to the base address of a program segment which field is loaded into PBR. The address stored in PBR is updated each time control is transferred from one segment to another. During execution of a segment, sequential locations of main memory 20 are addressed relative to PBR. To that end, address adder 26 adds the contents of PBR and PIR to form an absolute address. After this absolute address has been calculated, controller 40 produces a fetch control signal (F) which is applied to gate 29 and a word is transferred from memory 20 through gate 29 to P register 28. Since the word in P register 28 may contain more than one program operator, the PSR register 45 provides a means for identifying the program operator for execution.

The processor includes a stack extension memory within block 2 which is shown in more detail in FIG. 2. The stack extension memory comprises a plurality of stack extension registers SER30-0 through SER30-31 (not all shown). A bus b4 carries words being written into and read from the stack extension memory. A plurality of gates 93-0 through 93-31 selectively gate words carried by the b4 bus into respective stack extension registers. A plurality of gates 91-0 through 91-31 selectively gate words out of respective stack extension registers to the b4 bus. A selection matrix (SM94) has a plurality of output lives (R0 through R31) coupled by lines not shown to gates 91-0 through 91-31 respectively. During an operation in which a word is read out of the stack extension memory, SM94 applies a control signal on one of its output lines to enable a selected one of gates 91-0 through 91-31 to apply a word from a stack extension register to the b4 bus. A selection matrix (SM95) has a plurality of output lines (W0 through W31) coupled by lines not shown to gates 93-0 through 93-31 respectively. During an operation in which a word is written into the stack extension memory, SM95 applies a control signal on one of its output lines to enable a selected one of gates 93-0 through 93-31 to load a word carried by the b4 bus into a stack extension register.

The stack extension memory includes two registers for storing addresses to select stack extension registers during read and write operations. SESA77 stores an address pointing to a stack extension register as a source of a word for application to the b4 bus. SEDA80 stores an address pointing to a stack extension register as a destination for a word carried by the b4 bus. A third register TOSE74 also stores an address pointing to a stack extension register. The basic function of TOSE74 is to point to the stack extension register storing the top of stack extension word. TOSE74 is a conventional up/-down counter composed of flip-flops. TOSE74 has a count up input (+1) and a count down input (−1) and is responsive to control pulses applied to its inputs to increment and decrement the address it stores. TOSE74 also has a set input (S) and is responsive to a control pulse applied thereto to set each of its internal flip-flops to a '1' state. When so set, TOSE74 stores the binary equivalent of decimal 31 and thereby points to SER30-31.

An important feature of the stack extension memory is that it is programmatically addressable. That is, the program operator repertory includes operators containing addresses pointing to registers within the stack extension memory. For example, a value call operator which is described in more detail in connection with FIG. 11 contains an address couple field comprising an *ll* part and a δ part. Controller 40 is operative to cause the transfer of the address couple field of such program operators to a C register 61. As will be explained in more detail hereafter, controller 40 is further operative to transfer the δ part to SESA77 over a b30 bus connecting C register 61 to block 2. A δ value stored in SESA77 is gated via gate 96 to SM94 to select one of the stack extension registers for readout. The δ values 0 through 31 select registers SER30-0 through SER30-31 respectively.

The stack extension memory stores some of the intermediate results of processing in the form of a stack which is linked to the stack in memory 20 as an extension thereof. As will be explained in more detail hereafter, words are written into and read out of the stack extension memory in several distinguishable types of operations. In stack adjusting operations, words are pushed down and popped up on a last-in, first-out basis. In another type of operation words are written into and read from the stack extension memory on the basis of a selection made by a program operator. In still another type of operation words are flushed out of the stack extension memory and written into memory 20.

A register 10 and B register 12 provide temporary storage of words such as operands and control words of various types. Bus b1 and bus b2 carry operands from A register 10 to B register 12 respectively to input circuits of AL15 and a bus b3 carries the output of AL15 back to A register 10.

Figure 11:
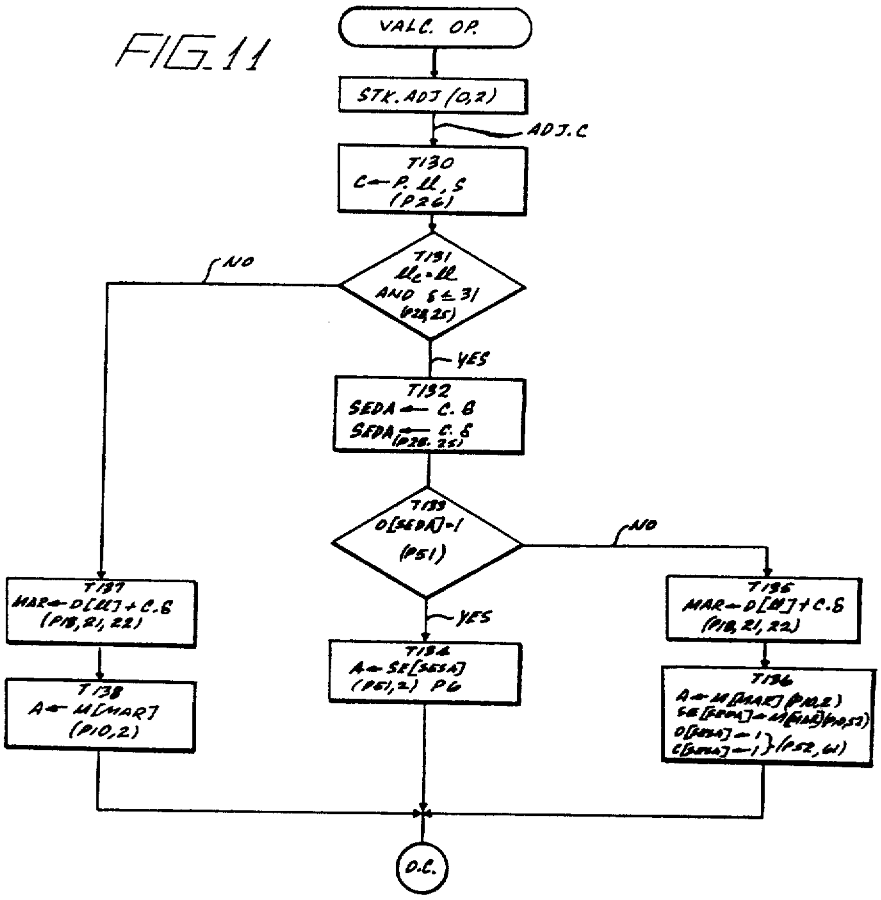
FIG. 11 is a flow diagram showing the manner in which a parameter captured in a stack extension register is called to the top of the stack.

As an example of the operation of AL15, the execution of an ADD operator is described hereafter in connection with FIG. 11. During the ADD operation a first operand stored in A register 10 is added to a second operand stored in B register 12; the sum of the two operands then replaces the first operand and the second operand is disregarded. Thus the first and second operands are said to be combined or digested.

A register 10, B register 12, the stack extension memory within block 2, and a plurality of locations 22 in the memory 20 taken together form a stack storage means. The stack storage means provides for the storage of the record of execution of a program in the form of a stack similar to the stack described above in connection with the discussion of U.S. Pat. No. 3,548,384. Thus the stack storage means stores the intermediate results accumulated during the execution of a plurality of program blocks and stores the linking control words such as the MSCW and the RCW.

F register 52 stores an address of memory 20 and the address stored therein is continually updated so that it points to a memory location 22 for storing the MSCW for the program block having control of the processor.

During the execution of program code for an entered block, the data processor accumulates words in the stack storage means. The F register 52 is set to point to the memory location reserved for storing the MSCW for the program block having control of the processor. The stack extension location SER30-0 is associated with the memory location pointed to by the F register 52 to form a corresponding pair of locations reserved for storing the MSCW for the program block having control. Furthermore the stack extension locations SER30-1 through SER30-31 are associated in one-to-one correspondence with a group of 31 sequentially addressable memory locations above the memory location pointed to by F register 52 so as to define a plurality of corresponding pairs of locations. Each pair is reserved for storing a different stack word and has four occupancy conditions. Before the actual accumulation of the stack word for which the pair is reserved, the pair is in a first condition wherein both the extension location and the corresponding memory location are unoccupied. After actual accumulation, the pair is either in a second condition wherein only the extension is occupied, or in a third condition wherein only the memory location is occupied, or in a fourth condition wherein both locations are occupied. The data processor has means (described below) settable to indicate the occupancy condition for each corresponding pair.

A stack stored in the stack storage means has a top of stack word and has, during most stages of operation, a top of memory stack word. The "top of stack word" is the word which was most recently added to the stack and which has not yet been digested. The "top of memory stack word" is the word which was most recently pushed-down out of B register 12 and which has not yet been popped-up back into B register 12. During various stages of program execution the place where the top of stack word is located changes. The top of stack word can reside in A register 10, B register 12, the stack extension memory or memory 20.

The data processor includes means for indicating where the top of stack word resides. A register 10 includes a flip-flop identified as AROF11 which indicates whether or not the top of stack word resides in A register 10. AROF11 has an ARO output signal which is a '1' when the top of stack word resides in A register 10 and is a '0' otherwise. B register 12 includes a corresponding flip-flop identified as BRO13 having a BRO output. When the top of stack word resides in B register 12, the BRO signal will be a '1' and the ARO signal will be a '0'. A condition wherein both the ARO and BRO signals are '0' indicates that neither A register 10 nor B register 12 stores the top of stack word and that the top of stack word is stored either in the stack extension memory or memory 20.

An S register 24 (FIG. 1) and the top of stack extension pointer register TOSE74 and a stack extension overflow flip-flop SEOV82 (FIG. 2) combine to indi- ıte where the top of memory stack word resides. It ıould be noted that the top of memory stack word is ıe top of stack word when A register 10 and B register 2 are empty. S register 24 is a conventional up/down ɔunter storing an address of memory 20. S register 24 as a count up input (+1) and a count down input (−1) nd is responsive to control pulses applied to its inputs ither to increment or to decrement the address it ores. As will be described in more detail hereafter ɔntrol pulses are applied to the inputs of S register 24 ) update the address stored therein as the stack exands and contracts. During operations wherein a word popped-up from memory 20, the word is read out of ne of the memory locations 22 pointed to by S register 4 and then the address stored in S register 24 is decreıented. During operations wherein a word is pushedown into memory 20, the address stored in S register 4 is incremented and then the word is written into one f the memory locations 22 pointed to by S register 24. EOV82 has a set input and a reset input for receiving ɔntrol pulses which change its state. An SEOV signal roduced by SEOV82 indicates whether or not the :ack has over-flowed out of the stack extension memry into the memory 20.

Before continuing with the description of the means ɔr indicating where the top of the memory stack word ɛsides recall that each extension register is associated ·ith a different memory location 22 to form correɔonding pairs. A particular one of the memory locaons 22 can be reserved for storing the top of memory :ack word but the top of memory stack word will not ctually be stored therein. In this situation, the top of ıemory stack word is actually stored in the stack exɛnsion register corresponding to the particular memry location 22. Furthermore, a series of memory locaons 22 can be reserved for storing without actually :oring any stack words. This feature of the present inention arises because S register 24 is counted up each me a word is pushed down out of B register 12 even ıough the word is pushed down into the stack extenıon memory and not into memory 20. Consequently, ıemory space in memory 20 is reserved for possible ıture storage of stack words residing in the stack exɛnsion memory.

On the other hand, memory space in the stack extenion memory can be reserved for possible future storge of stack words residing in memory 20. This is an nportant feature of the present invention and leads to ıe elimination of many time consuming accesses to ıemory 20. As will be explained in more detail in conection with the sketches shown in FIG. 4 and the flow iagram shown in FIG. 10, memory space is reserved ı the stack extension memory during the execution of ıe EXIT and RETURN operators. The RETURN oprator is inserted at the end of program blocks in the ature of procedures which return a value to another rogram block. The EXIT operator is inserted at the nd of a program string for other types of blocks.

Both the EXIT operator and the RETURN operator rder the data processor to start executing a different rogram block. By virtue of the nesting of program locks and the recursive use of procedures, execution f the EXIT and RETURN operators frequently cause ·ansfer of control to a program block which has parally been executed. Under these circumstances the ıtermediate results accumulated during the earlier artial execution of the block reside in memory 20. The present invention includes means for reserving space in the stack extension memory for possible future storage of the last named intermediate results. In this connection, consider again FIG. 2.

Associated with the stack extension memory is an occupancy indicating means preferably comprising a plurality of flip-flops, OF-0 through OF-31, (not all shown) each of which is associated with a different register (SER) of the stack extension memory. Each of the flip-flops OF-0 through OF-31 assumes a '1' state to provide an indication that its associated register is occupied in that it stores a stack word, and assumes a '0' state to provide an indication that its associated register is empty or unoccupied in that it does not store such a stack word. The indications provided by the occupancy indicating means are coupled to controller 40 (shown in FIG. 1). The state of the occupancy indicating means is controlled by a plurality of gating networks 90-0 through 90-31. Each of the gating networks 90 is responsive to control signals formed by controller 40 to appropriately set and reset the occupancy indicating flip-flops.

While the invention is not limited thereto, preferably as indicated by FIG. 2, each of the registers SER30-0 through SER30-31 also has an associated flip-flop CF-0 through CF-31. Each flip-flop CF-0 to CF-31 assumes a '1' state when the respective corresponding memory location 22 is occupied in that it stores a stack word and assumes a '0' state when the respective corresponding memory location is unoccupied. The copy indicating means are useful in eliminating accesses to memory 20 during execution of an ENTER operator which indicates that a new program block is being entered.

Thus in the preferred embodiment, each extension register includes occupancy and copy indicating storage cells having four states each indicating one of four possible occupancy conditions of a corresponding pair.

Consider again the means for indicating where the top of stack resides. When the top of stack word resides in A register 10, AROF11 so indicates by producing a '1' as its ARO output signal (i.e., ARO = 1). When it resides in B register 12, AROF11 and BROF13 so indicate by producing a '0' and a '1' as their ARO and BRO output signals (i.e. ARO = 0; BRO = 1). When it resides in the stack extension memory AROF11 and BROF13 indicate that A register 10 and B register 12 are empty by producing '0' signals at their ARO and BRO outputs (i.e. ARO = 0; BRO = 0); SEOV82 indicates that no overflow condition exists by producing a '0' as its SEOV output signal (i.e., SEOV = 0); TOSE74 points to the stack extension register storing the top of stack word; and the occupancy indicating flip-flop associated therewith produces a '1' as an output signal. The latter condition is symbolized as O[TOSE] = 1. If the occupancy flip-flop is a '0' the stack extension memory does not contain the top of stack word O[TOSE] = 0. The symbol C[TOSE] = 1 indicates that the copy indicating flip-flop associated with the register storing the top of stack word is producing a '1' as an output signal. The fact that the top of stack word resides in memory 20 is indicated in any of the following three ways. First: ARO = 0, BRO = 0, SEOV = 1. In this first case, an overflow condition exists and S register 24 points to the location within memory 20 which actually stores the top of stack word. This condition is symbolized as {M[S]} = top of stack word. Second: ARO = 0, BRO = 0, SEOV = 0, O[TOSE] = 0, and C[TOSE] = 1. In this second case, an overflow condition does not exist; however, a register within the stack extension memory has been reserved for storing but does not actually store the top of stack word. In this case the top of stack word is actually stored in memory 20 at the located pointed to by S register 24. Third: ARO = 0, BRO = 0, SEOV = 0, O[TOSE] = 1, and C[TOSE] = 1. In this third case the top of stack word actually resides in both memory 20 and the stack extension memory. Thus the top of stack word stored in the stack extension memory is said to be a copy of the top of stack word stored in memory 20.

The fact that a particular stack extension register is reserved for storing but does not actually store a stack word is indicated in the following manner. One, TOSE74 points to the particular stack extension register or to any other stack extension register having a higher address. Two, the occupancy indicating flip-flop associated with the particular stack extension register produces a '0' as an output signal. It should be noted that stack extension registers having a higher address than the address stored in TOSE74 are merely reserved for future storage of words not yet accumulated. Consequently, the states of their occupancy and copy indicating flip-flops are not material.

A feature of the present invention resides in reserving a plurality of stack extension registers upon exiting from one block to another. As will be explained in more detail in connection with FIG. 10, all of the occupancy indicating flip-flops OF-0 through OF-31 are simultaneously reset upon such an exit. To that end, as shown in FIG. 2, there is provided a CLEAR input line which carries a signal formed by controller 40 for simultaneously resetting all of the occupancy indicating flip-flops. Also during such an exit, as explained hereafter, TOSE74 is set to point to a calculated address of the stack extension memory. By virtue of the setting of TOSE74 and the clearing of the occupancy indicating flip-flops memory space is reserved in the stack extension memory for possible future storage of stack words relating to the block exited to.

In concluding the general description of the preferred embodiment, reference is made again to FIGS. 1 and 2 for a description of the function of S Save register 25 and FS register 71 respectively. S Save register 25 is a conventional counter register storing an address of memory 20 and having a count-up input, receiving control signals from controller 40 to increment the address stored therein by 1. S Save register 25 comes into play in the event of an overflow of stack words out of a stack extension memory into memory 20. In such event controller 40 causes gate 69 to transfer the address stored in S register 24 into S Save register 25. The address so transferred is the address of the location of memory 20 used for storing the first word to overflow out of the stack extension memory. FS register 71 serves to save for later use an address of the stack extension memory. The address saved therein is the address wherein an IMSCW is stored during MKS operation.

GENERAL DESCRIPTION OF OPERATION

The general operation of the data processing system is best understood after first considering the types of words stored in a stack. In general, these words are variables, reference words, and control words of various types. FIG. 3 is a sketch which illustrates the word structure of the reference words and the control words used herein. Shown in FIG. 3 are an incomplete mark stack control word (IMSCW), a mark stack control word (MSCW), a program control word (PCW), a segment descriptor (SD), an indirect reference word (IRW), and a word from a program code segment containing a plurality of program operator syllables. Table I gives an explanation of the various symbols used to identify the fields within the words shown in FIG. 3.

TABLE I

| Symbol | Description of Symbol |
|---|---|
| Tag | Identifies type of word. |
| DISP | An increment value which when added to the absolute address contained in the BOSR register gives the address of an MSCW. This value is used to link the MSCWs together to form an address environment list. |
| DF | A difference value indicating a stack depth; that is, the number of locations storing stack words accumulated during execution of a block. The address of the word in which this field is found minus this field gives the address of an MSCW. This value is used to link the MSCWs together to provide the stack history list. |
| ll,δ | This is an address couple. The ll part is the lexicographical level of a particular item and points to a particular display register. The δ part is an increment value or relative address. δ can be added to the content of the display register pointed to by ll to produce a main memory address. δ can also be used as a direct address of an item within the addressable stack extension. |
| SDI | A segment descriptor index. This is a relative address pointing to a segment descriptor. |
| E | An environment indicator. This is a one bit field indicating whether the word of which it is a part is an IMSCW or an MSCW. |
| ADDRESS | A value contained in a segment descriptor which points to the beginning of a program segment. |
| PIR,PSR | Values used for setting the PIR and PSR registers so that they point to the first program operator to be executed when control is transferred to a different program segment. |
| N | A value identifying whether the processor should go into its normal or control state. |
| LL | A value used for setting the LL register so that it indicates the lexicographical level of the program segment to which control is transferred. |

Figure 4:
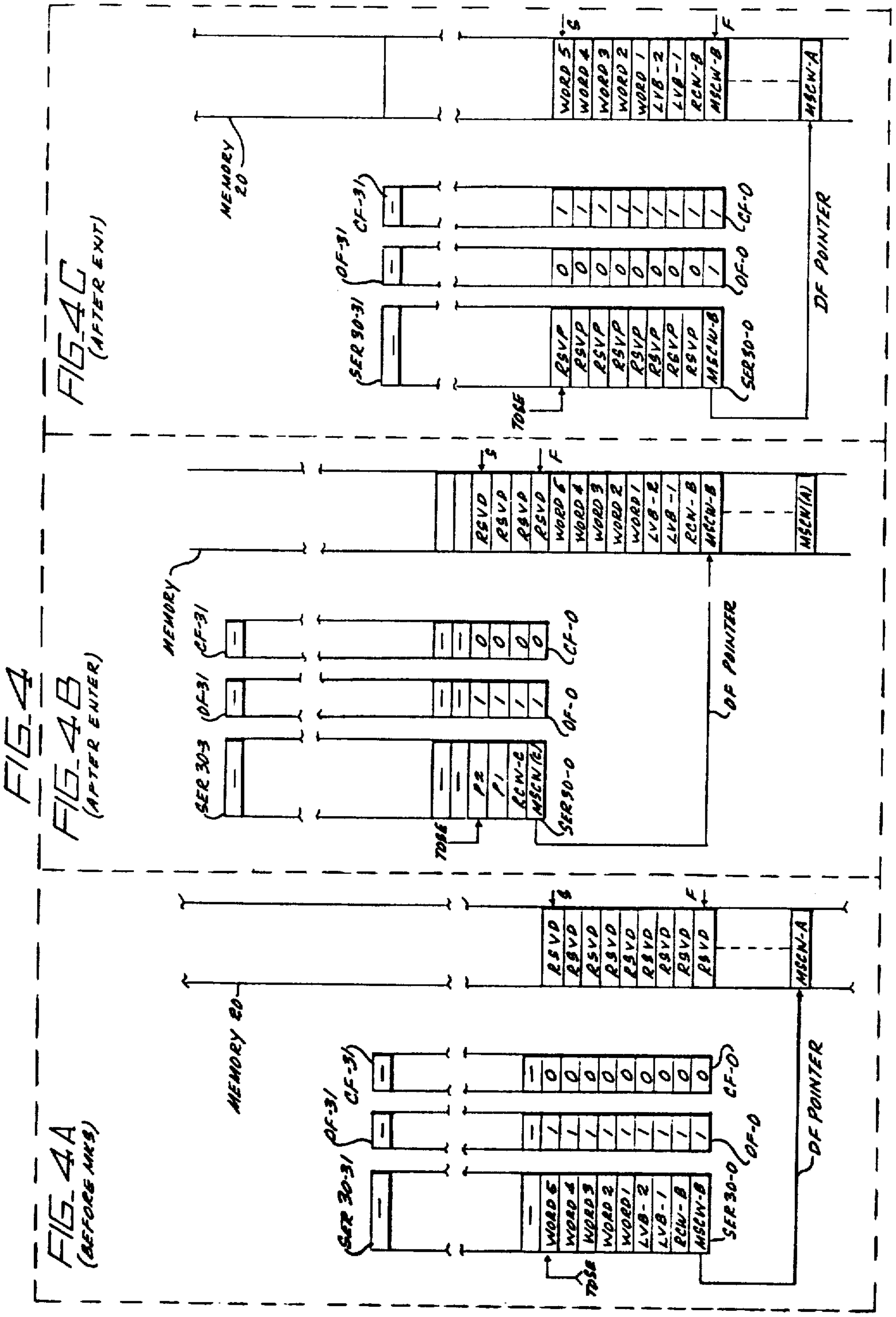
FIG. 4 comprises FIGS. 4A, 4B, and 4C which are sketches representing a snapshot of a condition of a stack before marking the stack and entering a new block; after entering a new block; and after exiting from the new block, respectively.

FIG. 4 comprises FIGS. 4A, 4B, and 4C and, among other things, illustrates how the stack extension memory is linked to a stack in memory 20.

Briefly, FIG. 4 shows an example of the manner in which stack words are distributed between memory 20 and the stack extension memory at three different stages of a particular program. In this example, a program segment for a block referred to as block A has been partially executed. The program segment for block A has caused an entry into a program segment for a block referred to as block B. The program segnent for block B has been partially executed. The program segment for block B includes a calling sequence (i.e., a sequence of program operators) which cause a procedural block (block C) to be entered. This calling sequence is bounded by an MKS operator (illustrated in detail in FIG. 7), and an ENTER operator (illustrated in FIGS. 8 and 9) and includes VALUE CALL operators (illustrated in FIG. 11) which bring words to the top of the stack and which in this example enable such words to be passed as parameters to the called procedure. FIG. 4A illustrates the condition of the stack before execution of the MKS operator and FIG. 4B illustrates the condition of the stack after execution of the ENTER operator. FIG. 4C illustrates the condition of the stack at the completion of the called procedure after the execution of an EXIT operator.

In the sketches of FIG. 4, memory 20 is represented as a column comprising a plurality of rectangles which represent individual locations of memory 20. F register 52 and S register 24 store addresses pointing to locations of memory 20; this is represented by the letters F and S with arrows pointing to the appropriate rectangles. The individual registers of the stack extension memory, and their associated occupancy indicating flip-flops and copy indicating flip-flops, are also represented as rectangles. TOSE74 stores an address pointing to one of the stack extension registers; this is represented by the letters TOSE and an arrow pointing to an appropriate rectangle.

Consider now FIG. 4A which illustrates a condition of the stack immediately before the execution of the MKS operator. In the stack stored in memory 20 there is shown the MSCW-A for the program block referred to as block A. In the example depicted in FIG. 4A the program segment for block A has been partially executed; consequently, a stack has been built up related to block A and this stack now occupies sequential locations of memory 20 above the MSCW-A. This is indicated in FIG. 4A by dashed line drawn above MSCW-A.

Immediately above the dashed line there is shown a location which has been reserved for storing the MSCW for block B (i.e., MSCW-B). F register 52 stores the address of this location. In addition, above this last mentioned location there are a plurality of locations of memory 20 which have been reserved for storing the stack built up by executing the program segment for block D. The locations which have been reserved are those locations bounded by and including locations pointed to by F register 52 and S register 24. In FIG. 4A each of these locations is labeled reserved (RSVD).

The stack words which have been accumulated during the execution of block B are presently stored in the stack extension memory. This information includes MSCW-B. MSCW-B is stored in SER30-0 which at this stage of operation is associated with the memory location, pointed to by the F register 52 and reserved for storing MSCW-B. Since SER30-0 is occupied by a stack word its associated occupancy indicating flip-flop OF-0 is in its '1' state. Since no valid copy of MSCW-B is stored in memory 20, CF-0 is in its '0' state. Above the MSCW-B and stored in SER30-1 is RCW-B which contains information which will be used upon exit or return from the program block B. Above RCW-B and stored in SER30-2 through SER30-8 are a pair of local variables for the block B (LVB-1 and LVB-2 and words 1 through 5). Since each of these registers is occupied by a stack word for which no valid copy exists in the respective corresponding memory locations in memory 20 their associated occupancy indicating flip-flops and copy indicating flip-flops OF-2 through OF-8 and CF-2 through CF-8 are in their '1' and '0' states respectively. In the example depicted in FIG. 4A word 5 is the current top of stack word; consequently, TOSE74 points to SER30-8. The stack extension registers above SER30-8 (i.e. SER30-9 through SER30-31) are unallocated and their contents and the states of their associated flip-flops are undefined as indicated by the lines shown in FIG. 4A.

The MSCW-B stored in SER30-0 contains a DF field pointing to the MSCW-A stored in memory 20. This is indicated in FIG. 4A by a line connecting these two MSCWs.

As indicated in FIG. 4A, S register 24 is now pointing to a location of memory 20 corresponding to the same relative address above the location reserved for MSCW-B as the relative address above SER30-0 pointed to by TOSE74. In other words, S = F + TOSE. Thus the locations reserved in memory 20 are in one to one correspondence with the stack extension registers occupied by stack words.

Consider now FIG. 4B which illustrates the condition of the stack after execution of an ENTER operator which causes a transfer of control from the program segment for block B to the program segment for procedural block C. The stack built up during the execution of block A remains in memory 20 as before and now all the stack related to block B has been transferred over to fill up the formerly reserve locations of memory 20. An MSCW-C has been formed to mark the beginning of a stack area for block C and now occupies SER30-0. A new RCW (RCW-C) now occupies SER30-1 and contains information that will be used when block C is exited from. Above RCW-C there is shown a pair of parameters (P1 and P2) which have been passed to procedural block C. TOSE74 has been adjusted so that it now points to the register of the stack extension memory (SER30-3) storing the current top of stack word (P-2). F register 52 has been adjusted so that it now points to a location of memory 20 which is reserved for storing MSCW-C, and thus at this stage of operation is now associated with SER30-0 to define a corresponding pair. S register 24 has been adjusted so that it now points to a location reserved for storing the top of stack word. The location within memory 20 intermediate and including the registers pointed to by F register 52 and S register 24 are similarly reserved for storing the stack words relating to block C and are in one-to-one correspondence with registers SER30-0 through SER30-3. MSCW-C contains a DF field pointing to the location of memory 20 now storing MSCW-B. The occupancy indicating means OF-0 through OF-31 have been appropriately adjusted so as to reflect the current distribution of words relating to block C between the stack extension memory and memory 20. That is, OF-0 through OF-3 are now in their '1' state; and CF-0 through CF-3 are in their '0' state. Comparison of FIG. 4A and FIG. 4B shows that the stack extension memory has been dedicated to storing the stack of words relating to the program segment having control.

FIG. 4C illustrates the condition of the stack after the execution of the EXIT operator. The EXIT operator causes a transfer of control back to the program segment for block B from procedural block C. Once again the MSCW-A and the stack words relating to the execution of block A still reside in memory 20. In addition MSCW-B and the stack words relating to the execution of block B still reside in memory 20. S register 24 has been adjusted to point to the location storing word 5. F register 52 has been adjusted to associate SER30-0 with the memory location storing MSCW-B. The stack words accumulated during the execution of procedural block C are no longer needed after execution of the EXIT operator and they have been discarded. FIG. 4C brings out the fact that now the stack extension memory has registers which have been reserved for storing the record of execution of block B. To that end TO-SE74 has been adjusted so that it now points to the same register which stored word 5 prior to the execution of the mark stack operator (i.e., SER30-8). Furthermore the copy indicating flip-flops CF-0 through CF-8 have been set to indicate that each of the respective memory locations store stack words.

With the condition of stack illustrated in FIG. 4C in mind, consider now two possible alternative program paths.

In a first alternative program path an EXIT operator is executed so as to transfer control back to block A. In this situation, as in the situation described above wherein control was transferred from block C back to block B, the stack words forming the record of execution of the block being exited from are no longer needed and are discarded after execution of the EXIT operator. If these stack words had been indiscriminately transferred back to the stack extension memory, a significant amount of time would have been wasted because in this example the words were never used again.

In a second alternative path a calling sequence including an ENTER operator is executed so as to transfer control to some other block such as a block nested within block B. In this situation, as in the situation decribed above wherein control was transferred from block B (the calling block) to block C (the called block) the stack words forming the record of execution of the calling block must be preserved and the stack extension memory must be reserved for storing the record of execution of the called block. If the stack words for the calling block which must be preserved had been indiscriminately transferred to the stack extension memory, a significant amount of time would have been wasted in this example because the words have to be preserved in the memory locations of memory 20.

DETAILED DESCRIPTION OF THE PREFERRED EMBODIMENT

Consider FIGS. 1 and 2, again for some of the details of the construction of the data processing system which were not brought out in the general description above. It will be appreciated from the ensuing description that many of the circuit blocks shown in the drawings can be implemented by commercially available integrated circuits. Numerous semiconductor manufacturers have published catalogs that give not only specifications for their integrated circuits but also application notes pertaining to typical ways in which they can be used. For example, National Semiconductor Corporation published in 1971 a catalog in which there are described a variety of integrated circuits suitable for use in connection with the circuit blocks shown in the drawings. This catalog also contains the customary application notes among which is an application note at page 90 showing an integrated circuit arrangement for performing a "1 out of 32 Decode Function." The following description of like functions performed by circuit blocks such as decode circuit 44 and decoder 88 shows the suitability of implementing these decoders with the above-identified integrated circuit arrangement.

Controller 40 is a conventional sequential timing circuit having an input circuit accepting signals from P register 28 and from other circuit elements of the processor. Controller 40 receives the ARO signal from AROF11 and the BRO signal from BROF13. In addition, controller 40 is coupled to receive the following signals from circuitry within block 2:

1. S0-S3 signals on the S bus; 2. the SEOV signal from SEOV82; 3. the = and ≠ signals from compare circuit 84; and 4. the = 31 and ≠ 31 signals from decoder 88 circuit. Controller 40 has an output circuit on which it produces a sequence of control signals identified as P1 through P100. Preferably controller 40 is of the type shown in U.S. Pat. No. 3,566,364. The control signals as produced by controller 40 are coupled by lines not shown to other circuits of the processor and thereby cause the circuits to manipulate data. In addition, controller 40 produces read and write control signals which are applied to the ACR bus and carried thereby to memory 20, an F signal which signal is applied to gate 29 for gating program operators into P register 28, and an ADD and a SUBTRACT control which are applied to address adder 26 to control its mode of operation.

P register 28 comprises a register and decoding network and stores a program operator that is currently being executed by the processor. P register 28 decodes a current program operator and applies a signal identifying the type of program operator to controller 40 to cause it to produce timing and control signals necessary to carry out that program operator.

The actual sequence of timing and control signals produced by controller 40 during the execution of various operations will be discussed hereafter in connection with the description of the flow charts of FIGS. 5–12.

Memory 20 is a conventional random access memory and operates in a manner well known in the computer art. A tuitorial treatment of the construction and operation of a computer memory is given in the above-identified textbook by Y. Chu. The pages of this textbook containing the pertinent exposition are pages 400, and 422–423. Memory 20 comprises a plurality of addressable memory locations 22, a memory information register (MIR21), a memory address register (MAR23) and a read-write control network (RW27). An exemplary commercially available memory embodying the foregoing arrangement is described in the "Burroughs B6500 Information Processing Systems Reference Manual," published in 1969 by Burroughs Corporation, the assignee of this invention.

Information is written into and read from memory locations 22 under the control of RW27. RW27 is responsive to the read and write control signals carried by the ACR bus, connected to the output circuitry of controller 40. When actuated by a control signal on the ACR line, information is transferred between a selected one of the memory locations 22 and MIR21. The particular location is selected by MAR23.

Absolute addresses are transferred into MAR23 by bus b6. The absolute address applied to bus b6 is derived from a plurality of sources. Gate 35 is responsive to control signals for controller 40 to select one of the plurality of absolute address sources. Address signals are carried to gate 35 by bus b10, bus b8, and a bus connected to gate 36. Bus b10 carries address signals from a memory destination address register (MDA66). The bus connecting gate 36 to gate 35 carries signals from address adder 26. Bus b8 carries the address signals to gate 35 from a plurality of sources, such as S register 24, S Save register 25, F register 52, and from any selected one of a plurality of temporary storage registers shown generally at 50.

Address adder 26 is a conventional binary add/subtract circuit having two input circuits for receiving addresses, an input circuit for receiving control signals derived from controller 40 and an output circuit. Address adder 26 operates in an add mode in response to an ADD control signal and operates in a substract mode in response to a SUBTRACT control signal. In its add mode address adder 26 is operative to add a base address and an increment value together to form an absolute address. For example, the address of a location in memory 20 containing a program operator is calculated by address adder 26 by adding the contents of PBR and PIR together. In its substract mode address adder 27 is operative to compute the address of a location of memory 20 which location is involved in storing the control words forming the stack history and address environment list. For example, the DF field of MSCW can be subtracted from the address stored in S register 24 so as to calculate the absolute address of a previous MSCW within the stack history list.

Address adder 26 calculates absolute addresses of words within a stack in memory 20, in substantially the same manner as is disclosed in above identifiedd U.S. Pat. No. 3,461,434. To that end, display register memory 55 is coupled to one input circuit of address adder 26 through gate 64. Associated with display register memory 55 is an LL register 56 which stores an $LL_c$ value indicative of the current lexicographical level of the program. Those program operators stored in P register 28 making reference to a location within the stack contain a field that orders a read or write operation and a field that indicates a location within the stack by means of an address couple. Controller 40 responds to such a program operator to cause the address couple to be gated through gate 60 into C register 61. As will be explained in more detail in connection with FIG. 10 when an *ll* part of the address couple is smaller than the $LL_c$ value, the stack location referred to is in memory 20. When the stack location is in memory 20, an address stored in one of the display registers is gated through the gate 64 to one input of address adder 26 and the other input of address adder 26 receives a δ value stored in C register 61. Address adder 26 adds the address derived from the display register and the δ value derived from C register 61 to produce an absolute address which is gated through gates 36 and 35 to MAR23. Simultaneously controller 40 produces either a read or write control signal which is carried by the ACR bus to RW27 causing a word to be read from the addressed memory location 22. The word read out is transferred into MIR21 and subsequently applied to the b5 bus. The b5 bus is the main information carrying bus connecting memory 20 to the stack organized data processor shown generally throughout FIG. 1.

Consider FIG. 2 again. As discussed above there is provided a plurality of gating networks 90-0 through 90-31 for controlling the states of the occupancy indicating means and the copy indicating means. Each of these gating networks is identical in construction and operation. Each receives as an input a CLEAR signal and control signals P60 through P64 from controller 40. Each of these gating networks has four output signals. One output signal is applied to a set input of an occupancy indicating flip-flop, a second output is applied to a reset input of an occupancy indicating flip-flop. A third output is applied to the set input of a copy indicating flip-flop and a fourth output is applied to a reset input of a copy indicating flip-flop. In addition, each of the gating networks 90 receives one of the output signals derived from selection matrix 95. For example, gating network 90-0 receives the W0 output signal of SM95 and gating network 90-31 receives the W31 output signal of SM94.

Each of these gating networks comprise a plurality of logical gates arranged to implement the following truth table. In the truth table OF-i-S represents the output of a gating network which is connected to the set input of an occupancy flip-flop; OF-i-R represents the output of gating network which is applied to the reset input of an occupancy indicating flip-flop; CF-i-S represents the output signal which is applied to the set input of a copy indicating flip-flop; and CF-i-R represents the signal applied to the reset input of a copy indicating flip-flop. The letter i represents an index value ranging from 0 to 31 corresponding to OF-0 and OF-31 and CF-0 through CF-31.

TRUTH TABLE

OF-i-S = (Wi)·(P60 + P61)
OF-i-R = CLEAR + (Wi)·(P63 + P64)
CF-i-S = (Wi)·(P61 + P62)
CF-i-R = CLEAR + (Wi)·(P64 + P65)

The foregoing truth table brings out the following points: (1) the CLEAR input causes each flip-flop OF-0 through OF-31 and CF-0 through CF-31 to be reset simultaneously, (2) the p61 signal is gated to a piar of flip-flops selected by SM95 and causes these two flip-flops to be set, (3) the P64 signal is gated to a pair of flip-flops selected by SM95 and causes these flip-flops to be reset, (4) the P60 signal is gated only to the set input of a selected occupancy indicating flip-flop, (5) the P63 signal is gated only to the reset input of a selected occupancy indicating flip-flop, (6) the P62 signal is gated only to the set input of a selected copy indicating flip-flop, (7) the P65 signal is gated only to the reset input of a selected copy indicating flip-flop. Thus it can be seen from the foregoing truth table that means are provided for resetting both the occupancy indicating flip-flop and the copy indicating flip-flop at the same time, and alternatively for setting or resetting only one of the occupancy indicating flip-flops or the copy indicating flip-flops.

An example of an arrangement of AND and OR logical gates which will implement the foregoing truth table is indicated in FIG. 2 within gating network 90-31. It will be obvious to those skilled in the art that other arrangements using other types of logical gates will also implement the same truth table.

The one-side output of each flip-flop OF-0 through OF-31 and CF-0 through CF-31 are connected to a plurality of gates 92-0 through 92-31. The R0 through R31 output signals of SM94 are applied to enable gates 92-0 through 92-31 respectively. Thus, SM94 selects one of these gates and enables it to gate its output to decoder 98. Decoder 98 has four outputs S0 through S3 corresponding to the four possible conditions of its two binary input signals. Thus decoder 98 forms a '1' signal on its S0 line when it receives two binary '0' input signals; a '1' signal on its S1 line when it receives a '0' and a '1' on its two input signals; a '1' signal on its S2 line when it receives a '1' and a '0' on its input lines, and a '1' signal on its S3 output lines when it receives a '1' and a '1' signal on its two input lines. The S0 through S3 output signals are carried by an S bus connected back to controller 40 so as to inform controller 40 at appropriate times about the occupancy status and copy status of appropriate registers within the stack extension memory.

Figure 5:
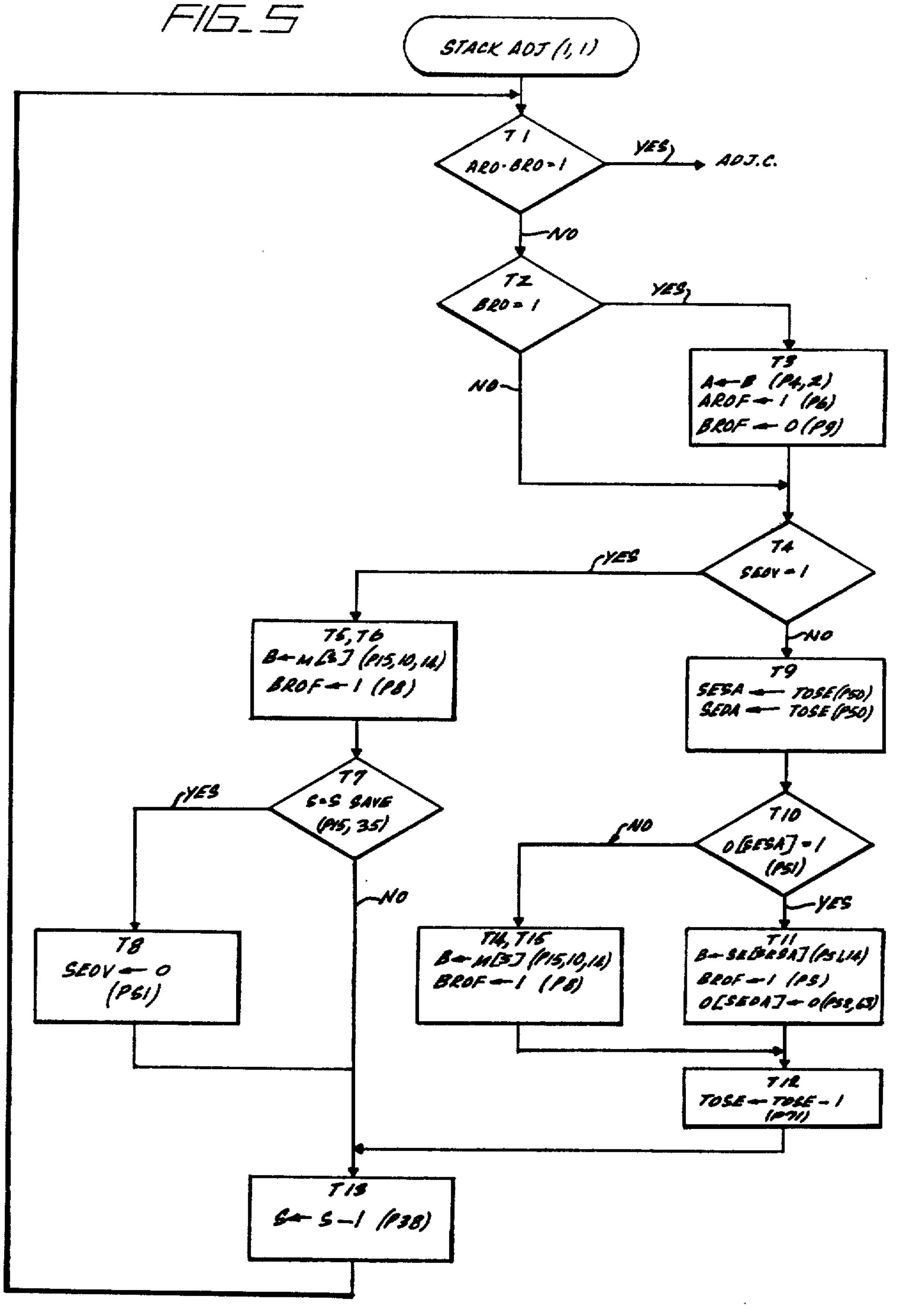
FIG. 5 is a flow diagram of the STK ADJ (1,1) operation of the present invention.

Consider now FIG. 5 in connection with FIGS. 1 and 2. FIG. 5 is a flow chart illustrating the manner in which the stack organized machine embodying the present invention adjusts the stack so as to fill both A register 10 and B register 12. Many different types of program operators within the instruction repertory of the machine will require such a stack adjustment. For example, in the execution of a Polish notation string an ADD operator will require two operands in A register 10 and B register 12. The symbol STK ADJ (1,1) is used to mean the operation wherein words are popped up from the stack to fill A register 10 and B register 12.

Controller 40 has 15 states (T1-T15) which are involved in the STK ADJ (1,1) operation. In certain states controller 40 causes checks to be made of various registers. In FIG. 5 (and also in FIGS. 6–12 described hereafter) each check made by controller 40 is indicated by a diamond shaped block. Based on the result of each check controller 40 enters one of two alternate states.

The actual sequence of events and the time required to perform the STK ADJ (1,1) operation depends upon where the top two words of the stack reside.

Consider a first example wherein the top two words of the stack reside in A register 10, and B register 12, respectively (ARO and BRO = 1). At the outset of the STK ADJ (1,1) operation controller 40 enters state T1 and examines the status of A register 10 and B register 12. To that end the ARO and BRO signals from AROF11 and BROF13 are applied to controller 40. In this first example ARO and BRO are equal to '1'. Controller 40 checks these signals and determines that there is no need to adjust the stack and therefore forms an adjust complete signal (ADJ.C.).

Consider now a second example wherein the following initial conditions exist at the outset of the STK ADJ (1,1) operation. A register 10 is unoccupied, B register 12 stores the word at the top of the stack, and an overflow condition exists wherein a single stack word has overflowed out of the stack extension and is stored in memory 20. Under these circumstances ARO = 0, BRO = 1, SEOV = 1, and S = S Save. First, controller 40 enters state T1 and checks ARO and BRO. Since both ARO and BRO are not equal to '1', stack adjustment is necessary and controller 40 enters state T2. During state T2 controller 40 makes a check of BRO only. As shown in FIG. 5, when BRO is equal to '1' during state T2, controller 40 responds by entering state T3. Briefly, during state T3 controller 40 causes the top of stack word to be transferred from B register 12 to A register 10. Also controller 40 causes AROF11 and BROF13 to change states. That is, A ← B, AROF ← 1, BROF ← 0. To this end, controller 40 produces control signals P4, P2, P6, and P9. P4 enables gate 17 and P2 enables gate 16, thereby transferring the top of stack word from B register 12 to A register 10. P6 is applied to the set input of AROF11 thereby marking A register 10 as occupied. P9 is applied to the reset input of BROF13, thereby marking B register 12 as unoccupied. Thus during state T3 the word in B register 12 is popped up into A register 10 and B register 12 is made available to accept a word to be popped up from either memory 20 or the stack extension memory.

Next, controller 40 enters state T4 and examines the SEOV signal which is derived from the SEOV82 flip-flop. SEOV82 indicates whether or not there has been an overflow out of the stack extension memory into memory 20.

As shown in FIG. 5, when SEOV equals 1, as in this example, controller 40 responds by entering states T5 and T6. Briefly, during states T5 and T6 controller 40 causes a word stored in memory 20 at the location pointed to by S register 24 to be read out and transferred into B register 12. Also, controller 40 causes BROF13 to be set to indicate that the B register is now occupied. That is, B ← M[S] and BROF ← 1. To that end, controller 40 produces during states T5 and T6 control signals P15, P10, P14, and P8. P15 is applied to gates 69 and 35 and thereby causes the address stored within S register 24 to be transferred to MAR23 so as to select one of the memory locations 22. P10 is applied to gate 33 which causes the word read out from the selected one of memory locations 22 and temporarily stored in MIR21 to be applied to the b4 bus. P14 is applied to gate 18 which transfers the word carried by the b4 bus into B register 12. Thus the word at the top of the stack stored in memory 20 has been read out and transferred to B register 12. P8 is applied to the set input of BROF13 and thereby marks B register 12 as occupied.

Next, controller 40 enters state T7 and causes a comparison to be made between the address stored in S register 24 and the address stored in S Save register 25. To that end controller 40 produces control signals P15 and P35. P15 is applied to gate 69 and P35 is applied to gate 68. These gates respond by applying the address stored in S register and the address stored in S Save register 25 to the two inputs of compare circuit 57. The outputs of compare circuit 57 which are identified as = or ≠ are applied to controller 40. If the address stored in S register 24 is equal to the address stored in S Save register 25, as in this example, controller 40 next enters state T8 and produces control signal P81. P81 is applied to the reset input of SEOV82, thereby resetting that flip-flop ot its '0' state. SEOV82 is reset at this time because an overflow condition no longer exists by virtue of the operations which occurred during states T5 and T6 and which caused the single overflow word to be read out of memory 20 and to be loaded into B register 12.

Following state T8 controller 40 enters state T13 and produces control signal P38. P38 is applied to the count-down input of S register 24 thereby causing the address therein to be decremented by '1'. That is, S ← S − 1. S register 24 is decremented at this time so that the address stored therein will be updated to point to the location of memory 20 which is reserved for storing the word at the top of the memory stack.

Following state T13 controller 40 loops back to state T1 again. When controller 40 enters state T1 for the second time, it will find that both the ARO and the BRO signals are '1'. This condition now exists because the ARO signal was set to a '1' during state T3 and the BRO signal was set to a '1' during state T6. Since the ARO and BRO signals are now equal to '1' controller 40 forms the ADJ.C. signal.

Consider now a third example wherein the following initial conditions exist at the outset of the STK ADJ (1,1) operation. A register 10 is unoccupied; B register 12 stores the word at the top of the stack; and an overflow condition exists wherein a plurality of stack words have overflowed out of the stack extension and are stored in memory 20. Under these circumstances ARO = 0, BRO = 1, SEOV = 1, and S ≠ S Save.

In this example, controller 40 proceeds through states T1 to T7 exactly as described above in connection with second example of operation. However, during state T7 compare circuit 57 will indicate that the address stored in S register 24 is not equal to the address stored in S Save register 25. Consequently, as shown in FIG. 5, controller 40 will skip state T8 and instead enter state T13 directly. State T8 is skipped at this time and SEOV82 is not reset because an overflow condition still exists because a plurality of stack words have overflowed out of the stack extension memory.

During state T13 controller 40 causes the address stored in S register 24 to be decremented by '1' as described above and then controller 40 loops back to state T1 to form the ADJ.C. signal as described above.

Consider now fourth example wherein the following initial conditions exist at the outset of the STK ADJ (1,1) operation. A register 10 is unoccupied, B register 12 stores the word at the top of the stack, no overflow condition exists, and a register within a stack extension memory has been reserved for storing but does not actually store the word at the top of the memory stack and the word at the top of the memory stack resides in memory 20. Under these circumstances, ARO = 0, BRO = 1, SEOV = 0, and O[TOSE] 1.

In this example of operation controller 40 proceeds through states T1 through T4 exactly as described above. However, during state T4 when controller 40 examines the SEOV output it finds that SEOV is equal to 0. As shown in FIG. 5, controller 40 responds to this condition by entering state T9.

During state T9, controller 40 produces control signal P50. P50 is applied to gates 73, 78, and 81. When enabled by P50, these gates cause transfers of the address stored in TOSE74 into both SESA77 and SEDA80. That is, SESA ← TOSE and SEDA ← TOSE. By virtue of these operations the address stored within TOSE74 pointing to the register of the stack extension memory which is reserved for storing the top of memory stack word has been loaded into the address registers SESA77 and SEDA80.

Following state T9 controller 40 enters state T10 and makes a check to determine whether or not the word at the top of the memory stack actually resides in the stack extension memory. In this example of operation that word is stored in memory 20 and not in the stack extension memory. During state T10 controller 40 produces control signal P51. P51 is applied to gates 76 and 96, thereby causing the address stored in SESA77 to be applied to SM94. In response SM94 produces a gating signal on one of its output lines R0-R31. The selected one of the output lines of SM94 enables a selected one of the gates 92 which respond by applying the output of an occupancy indicating flip-flop to decoder 98. The S0-S3 outputs of decoder 98 are applied to controller 40 which examines these outputs in order to determine which state to enter next. If O[SESA] ≠ 1 as in this example of operation, controller 40 responds by entering states T14 and T15. Briefly, during states T14 and T15, controller 40 causes the word at the top of the memory stack stored in memory 20 to be read out and transferred to B register 12. Also controller 40 marks BROF13 to indicate that B register 12 is occupied. The operation occurring during states T14 and T15 is identical to the operation described above in connection with states T5 and T6.

Following state T15 controller 40 enters state T12 and causes the address stored in TOSE74 to be decremented by '1'. That is, TOSE ← TOSE - 1. TOSE74 is decremented at this time so that the address stored therein will be updated to point to the register of the stack extension memory which is reserved for storing the word at the top of the memory stack. Controller 40 achieves this by producing control signal P71. P71 is applied to the countdown input of TOSE74.

Following state T12 controller 40 enters state T13 and proceeds through state T13 back to state T1 and then forms the ADJ.C. signal as described above.

Consider now a fifth example wherein the following initial conditions exist. A register 10 is unoccupied, B register 12 stores the word at the top of the stack, no overflow condition exists, and the word at the top of the memory stack is actually stored in one of the stack extension registers. Under these circumstances ARO = 0, BRO = 1, SEOV = 0, and O[SESA] = 1.

In this example of operation, controller 40 proceeds through states 1 through 4 and then branches to states T9 and T10 in the same manner as described in the fourth example of operation. However, in this fifth example of operation, during state T10 controller 40 finds that the word at the top of the memory stack is actually stored in the stack extension register. Consequently, as shown in FIG. 5, controller 40 responds by entering state T11 instead of states T14 and T15 as in the fourth example of operation. Briefly, during state T11 controller 40 causes the word at the top of the memory stack stored in the stack extension memory to be transferred to B register 12. That is, B ← SE(SESA), BROF ← 1, O(SEDA) ← 0. To this end, controller 40 produces control signals P51, P14, P8, P52, and P63. P51 is applied to gates 76 and 96 and thereby causes the address stored in SESA77 to be applied to SM94 and causes the contents of a selected stack extension register to be applied to the b4 bus. The selected register is the register pointed to by TOSE74 and is the register storing the top of memory stack word. P14 is applied to gate 18 which causes the word carried by the b4 bus to be loaded into the B register 12. P8 is applied to the set input of BROF13 thereby marking the B register 12 as occupied. P52 is applied to gates 79 and 97 thereby causing the address stored in SEDA80 to be applied to SM95. SM95 forms a gating signal on one of its gating lines Wo-W31 and the control signal P63 combines with the gating signal from SM95 to reset the appropriate occupancy indicating flip-flop.

Following state T11 controller 40 enters states T12, T13 and T1 in sequence and then forms the ADJ.C. signal.

Consder now a sixth and final example wherein the following initial conditions exist. Both A register 10 and B register 12 are unoccupied, an overflow condition exists wherein a single stack word has overflowed out of stack extension and is stored in memory 20 and a register of the stack extension memory has been reserved but does not actually store the word beneath the top of stack word. Under these circumstances ARO = 0, BRO = 0, SEOV = 1, S = S Save, and O(TOSE) ≠ 1.

In this example of operation, controller 40 finds during state T1 that both ARO and BRO are equal to 0 and finds during state T2 that BRO is equal to 0. As indicated in FIG. 5, under these circumstances controller 40 branches from state T2 to state T4. Thus state T3 is omitted inthis example of operation. State T3 is omitted because it is during that state wherein a word is transferred from B register 12 to A register 10. In this example of operation there is no word stored in B register which can be so transferred.

During state T4 controller 40 finds that an overflow condition exists (i.e., SEOV = 1) and proceeds to states T5 and T6. During states T5 and T6 the word at the top of the stack is read out from memory 20 and loaded into B register 12, and B register 12 is marked as occupied in the manner previously described (i.e., B ← M(S), BROF ← 1). Next, controller 40 enters state T7 and finds that the address stored in S register 24 and S Save register 25 are equal. The control signals formed and the response of the various gates to these control signals during this operation has previously been described. Since these two addresses are equal controller 40 proceeds to enter state T8 and cause the SEOV82 flip-flop to be reset. Next controller 40 enters state T13 and causes the address stored in S register 24 to be decremented by one. Next controller 40 loops back to enter state T1 for a second time. In this example of operation, controller 40 finds during state T1 that the STK ADJ (1,1) operation is not complete. This is true because only B register 12 has had a word popped up from the memory stack during the first pass through the loop, and A register 10 has not been affected. Therefore, controller 40 enters state T2 again. In this second time in which controller 40 enters state T2 it now finds that B register 12 is occupied. Consequently controller 40 causes the word in B register 12 to be popped up into A register 10 in the manner previously described (A ← B, AROF ← 1, BROF ← 0).

Following state T3 controller 40 enters state T4 again. In this second time in which controller 40 enters state T4 it now finds that no overflow condition exists. This is indicated by the fact that SEOV82 is now producing a '0' signal on SEOV line. SEOV82 was reset during T8 in the first pass through the loop. Following state T4 controller 40 enters state T9. During state T9 the address stored in TOSE74 is transferred into SESA77 and SEDA80 in the manner previously described.

Following state T9 controller 40 enters state T10 and causes a check to be made of the occupancy indicating flip-flop associated with the register pointed to by SESA77. Under the circumstances of the present example of operation O(SESA) ≠ 1. Consequently controller 40 enters next states T14 and T15. During states T14 and T15 controller 40 causes the words stored in the location of memory 20 pointed to by S register 24 to be transferred to the B register 12 in the manner described above (i.e., B ← M(S), BROF ← 1).

Next, controller 40 enters state T12 and causes the address stored in TOSE74 to be decremented by one. Following state T12 controller 40 enters state T13 and causes the address stored in S register 24 to be decremented by one. Following state T13, controller 40 loops back to state T1 to enter state T1 again for the third time. In its third entry into state T1 controller 40 now finds that the ARO and BRO signals are both equal to one and consequently forms the ADJ.C. signal.

It will be obvious to those skilled in the art that there are several other paths which controller 40 follows through the flow chart of FIG. 5 under other different initial conditions. These other paths need not be described herein because the foregoing examples have brought out the operations which occur in every possible state of controller 40 involved in the STK ADJ (1,1) operation. In summary, FIG. 5 shows that controller 40 will proceed through the loop formed by T1-T13-T1 state a sufficient number of times so as to load both A register 10 and B register 12 and will set the AROF11 and BROF13 flip-flops so as to indicate that their associated registers are occupied.

Figure 6:
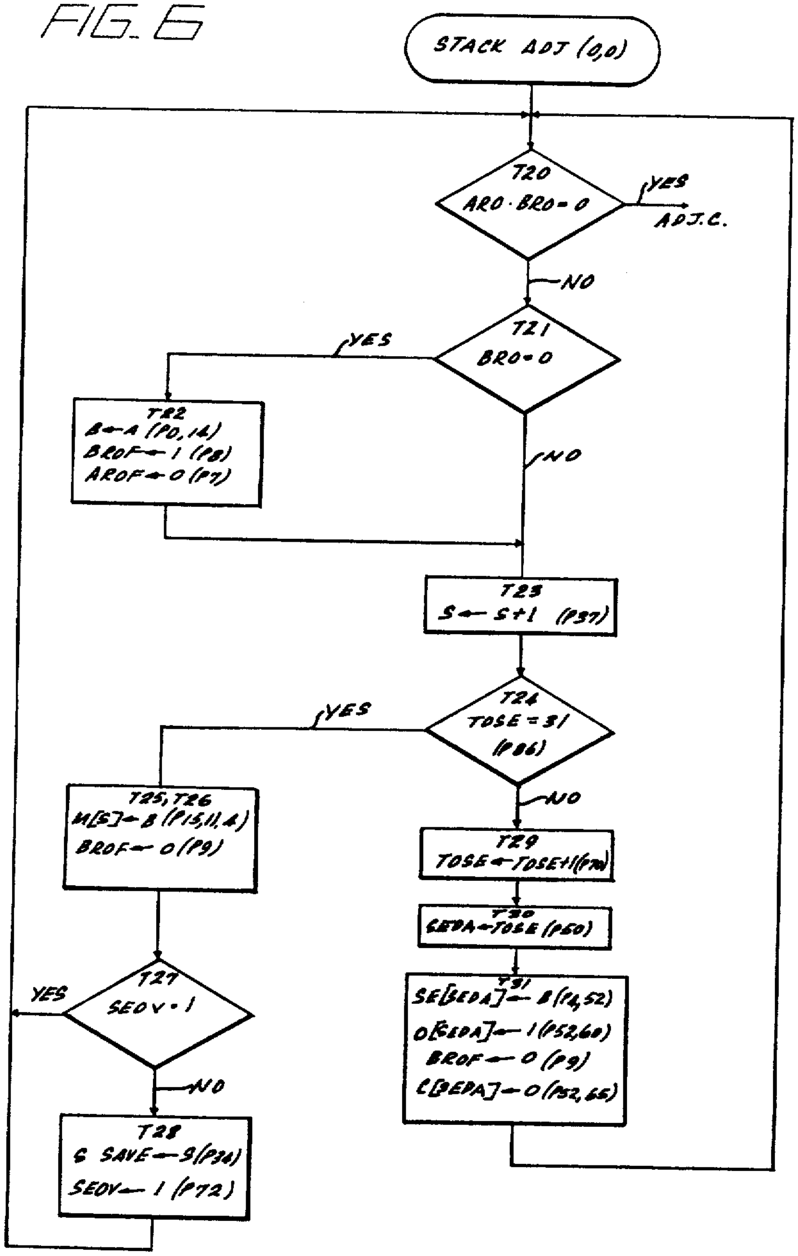
FIG. 6 is a flow diagram of the STK ADJ (0,0) operation of the present invention.

Consider now FIG. 6 in connection with FIGS. 1 and 2. FIG. 6 is a flow chart illustrating the manner in which words are pushed down into the stack. The symbol STK ADJ (0,0) is used to indicate the operation wherein words are pushed down into the stack so as to make A register 10 and B register 12 empty. This operation is sometimes called adjusting the stack down.

The states of controller 40 which are involved in the STK ADJ (0,0) operation are states T20-T31.

The actual sequence of events and the time required to perform the STK ADJ (0,0) operation depends upon where the two topmost words of the stack reside and also depends upon the availability of memory space in the stack extension memory. Thus, when a word is pushed down from B register 12 and the stack extension memory is already full the word is written as an overflow into memory 20.

Consider first a situation wherein A register 10 and B register 12 are already empty. Under these circumstances the ARO and BRO signals are equal to 0. At the outset of the STK ADJ (0,0) operation controller 40 enters state T20 and makes a check of the ARO and BRO signals. In this example, ARO and BRO are 0; consequently, controller 40 determines that there is no need to adjust the stack down and it forms an ADJ.C. signal.

Consider next the situation wherein A register 10 is unoccupied, B register 12 is occupied and stores the word at the top of the stack, and a single word has overflowed out of the stack extension and is stored in memory 20. Under these circumstances ARO = 0, BRO = 1, TOSE = 31, and SEOV = 1. First controller 40 enters state T20 and checks ARO and BRO. Since both ARO and BRO are not equal to 0 controller 40 enters state T21. During state T21 controller 40 makes a check of BRO only. As shown in FIG. 6, when BRO is equal to 0 during state T21, controller 40 responds by entering state T23. During state T23 controller 40 causes the address stored in S register 24 to be incremented by 1 i.e. S ← S + 1). To that end controller 40 produces ontrol signal P37 which is applied to the count up nput of S register 24.

Following state T23 controller 40 enters state T24 nd causes a check to be made to determine whether he stack extension memory is full. To that end, during tate T24 controller 40 produces control signal P86. '86 is applied to gate 89 thereby causing an address tored in TOSE74 to be applied to decoder 88 which n turn determines whether or not that address is equal r not equal to 31. When the address stored in TOSE74 s equal to 31 as in this example of operation controller 40 responds by entering states T25 and T26.

Briefly during states T25 and T26 controller 40 auses the word at the top of the stack now occuping 3 register 12 to be written into memory 20 (i.e. M[S] ← B, BROF ← 0). To that end controller 40 produces control signals P15, P11, P4, and P9. P15, P11, and P4 are applied to gates 69, 35, 34, and 17, thereby causing the word stored in B register 12 to be written nto a memory location 22 selected by the address in S egister 24. P9 is applied to the reset input of BROF13 hereby causing it to indicate that B register 12 is unoccupied.

Next, controller 40 enters state T27 and causes a check to be made of the output of SEOV82. If the SEOV82 flip-flop is in its '1' state as in this example of operation, controller 40 loops back and enters state T20 again. The second time that controller 40 enters state T20 in this example of operation it will find that both ARO and BRO are equal to 0. This is true because he ARO signal was initially equal to 0 and the BRO signal was caused to be reset to 0 during state T26 as described above. Consequently, controller 40 informs the ADJ.C. signal following the check during the second ime it has entered state T20.

Consider now an example wherein the following initial condition exists. A register 10 is unoccupied, B register 12 is occupied and stores the word at the top stack, the stack extension memory is full but no words have overflowed out of the stack extension memory nto memory 20. Under these circumstances ARO = 0, BRO = 0, TOSE = 31, and SEOV = 0.

In this example of operation controller 40 proceeds through states T20, 21, 23, 24, 25, 26, and 27 as described above. However, in this example operation during state T27 controller 40 senses that the SEOV signal s equal to 0. Consequently controller 40 enters next state T28. Briefly, during state T28 controller 40 causes the address stored in S register 24 to be trasnferred into S Save register 25 and also causes SEOV82 to be set to its '1' state (i.e. S Save ← S, SEOV ← 1). To that end, controller 40 produces control signals P34 and P72. P34 is applied to gate 69 which causes the address stored in S register 24 to be transferred into S Save register 25. P72 is applied to the set input of SEOV82. SEOV82 is set at this time because an overflow condition now exists by virtue of the operation during state T25 and T26 wherein the word at the top of the stack was transferred into memory 20.

Following state T28 controller 40 returns to enter state T20 again. The second time that controller 40 enters state T20 in this example of operation, it senses that the ARO and BRO signals are equal to '0'. Consequently controller 40 produces the ADJ.C. signal.

Consider now an example wherein the following initial conditions exist. A register 10 is unoccupied, B register 12 is occupied and stores the word at the top of the stack, and the stack extension memory is not full. Under these circumstances ARO = 0, BRO = 1, and TOSE ≠ 31.

In this example of operation controller 40 proceeds through states T20, T21, T23, and T24 as described above.

During state T24 controller 40 makes a check to determine whether or not the stack extension memory is full. When the stack extension memory is not full as in this example, the address stored in TOSE74 will not equal 31. Controller 40 senses this condition and next enters state T29. During state T29 controller 40 causes the address stored in TOSE74 to be incremented by '1' (i.e., TOSE ← TOSE + 1). To that end, controller 40 produces control signal P70 which is applied to the count-up input of TOSE74.

Next controller 40 enters state T30 and causes the address stored in TOSE74 to be gated into SEDA80 (i.e., SEDA ← TOSE). To that end controller 40 produces control signal P50. P50 is applied to gates 73 and 81, thereby transferring the address from TOSE74 into SEDA80.

Following state T30 controller 40 enters state T31. Briefly, during state T31 controller 40 causes the word stored in B register 12 to be written into the stack extension register pointed to by the TOSE74 register. Simultaneously, controller 40 causes the occupancy indicating flip-flop associated with that register to be set to its '1' state, causes BROF13 to reset, and causes the copy indicating flip-flop associated with the appropriate stack extension register to be reset (i.e., SE[SEDA] ← D, O[SEDA] ← 1, BROF ← O, C[SEDA] ← 0). To that end controller 40 produces control signals P4, P52, P60, P9, and P65. P4 is applied to gate 17 so as to gate the word stored in B register 12 onto the b4 bus which carries that word to the stack extension memory. P52 is applied to gates 97 and 79 so as to gate the address in SEDA80 to SM95. SM95 responds by forming a '1' on a selected one of its output lines WO-W31. The output line of SM95 which is so selected enables one of the gates 93-0 through 93-31 and carried by the b4 bus is written into the appropriate stack extension register. P9 is appplied to the reset input of BROF13 so as to mark the B register 12 as unoccupied. P60 is applied to the gating networks 90-0 through 90-31 and is combined with the signal derived from SM95 to cause the appropriate occupancy indicating flip-flop to be set to its '1' state. P65 is applied to the gating networks 90-0 through 90-31 and is combined with the output signal from SM95 to cause the appropriate copy indicating flip-flop to be reset to 0. Following state T31 controller 40 loops back to enter state T20 again. The second time that controller 40 enters state T20 in this example of operation it senses that ARO and BRO are both equal to 0 and therefore forms the ADJ.C. signal.

Consider now an example wherein the following initial conditions exist. A register 10 is occupied, B register 12 is unoccupied, the stack extension memory is full and an overflow condition exists. Under these circumstances ARO = 1, BRO = 0, TOSE = 31, SEOV = 1.

In this example of operation, controller 40 proceeds through states T20 and T21 as described above so as to check the status of A register 10 and B register 12. In this example of operation controller 40 senses during state T21 that B register 12 is unoccupied. Consequently, controller 40 branches to state T22 and causes the word stored in A register 10 to be transferred into B register 12 (i.e., B ← A, BROF ← 1, AROF ← 0). To that end controller 40 produces control signals PO, P14, P8 and P7. PO and P14 are applied to gates 14 and 18 and thereby cause the contents of A register 10 to be transferred into B register 12. P8 is applied to the set input of BROF13 thereby causing it to indicate that B register 12 is occupied. P7 is applied to reset input of AROF11 thereby causing it to indicate that A register 10 is unoccupied. By virtue of this operation the word which had been stored in A register 10 has been pushed down into B register 12 and now A register 10 is unoccupied and B register 12 is occupied.

Following state T22 controller 40 enters state T23 and causes the address stored in S register 24 to be incremented by '1' as described above. Next controller 40 enters state T24 and causes a check to be made to determine whether or not the stack extension memory is full. In this example of operation, stack extension memory is full (as indicated by the fact that TOSE = 31). Consequently controller 40 next enters states T25 and T26 so as to cause the word which has been pushed down into B register 12 to be written into memory 20 at the location pointed to by S register 24. The operations occurring during states T25 and T26 have been described above. The following states T25 and T26 controller 40 continues through state T27 and T20 again for a second time. The second time the controller 40 enters state T20 during this example of operation, it senses that both ARO and BRO are equal to 0 and therefore forms the ADJ.C. signal.

Consider now an example wherein the following initial conditions exist. A register 10 is occupied, B register 12 is occupied and the stack extension memory has one remaining register which is available for storing a stack word. Under these circumstances ARO = 1, BRO = 1, TOSE ≠ 31, and TOSE + 1 = 31.

In this example of operation, controller 40 proceeds through states T20 and T21 and determines that neither ARO nor BRO are equal to 0. Consequently, controller 40 skips state T22 and enters state T23. During state T23 controller 40 increments the address stored in S register 24, as described above, and next enters state T24. During state T24 controller 40 senses that there is an available register within the stack extension memory for storing a word (i.e., TOSE ≠ 31). Consequently controller 40 next enters state T29 and causes the address stored in TOSE74 to be incremented by 1, as described above.

Next controller 40 enters states T30 and T31 and causes the word stored in B register 12 to be written into the available register within the stack extension memory. These operations have been described in detail above. Following state T31 controller 40 loops back to enter state T20 for a second time. In this example of operation when controller 40 enters the T20 it will still find that both ARO and BRO are not equal to 0. This is true because although the word which was formerly stored in B register 12 has been written into stack extension memory a word still remains in A register 10. Consequently controller 40 next enters state T21 and checks the occupancy status of B register 12 again.

During state T21 controller 40 senses that B register 12 is unoccupied and therefore controller 40 branches to state T22. During state T22 controller 40 causes the words stored in A register 10 to be transferred down to B register 12 (i.e., B ← A, BROF ← 1, AROF ← 1, AROF ← 0). Following state T22 controller 40 enters state T23 again. During state T23 the address stored in S register 24 is incremented by 1. Next controller 40 enters state T24 for a second time.

The second time the controller 40 enters state T24 in this example of operation, it senses that TOSE74 now stores the address 31. This is true by virtue of the incrementing of the TOSE74 during state T29 as described above.

After sensing that the address stored in TOSE74 is equal to 31 during state T24 controller 50 next enters state T25 and T26. During these states the word now stored in B register 12 is written into memory 20 at the location pointed to by S register 24 (i.e., M[S] ← B, BROF ← 0). Following state T26 controller 40 enters state T27 and makes a check of the SEOV82 flip-flop. In this example of operation SEOV is not equal to 1 at this stage of operation, consequently controller 40 enters state T28 and causes the address stored in S register 24 to be gated into S Save register 25. Simultaneously controller 40 causes the SEOV82 flip-flop to be set to its '1' state. Following state T28 controller 40 returns to state T20 for a third time. The third time, controller 40 enters state T20 in this example of operation it finds that both ARO and BRO are equal to 0, and consequently forms the ADJ.C. signal.

It will be obvious to those skilled in the art that there are several other paths which controller 40 follows through the flow chart of FIG. 6 under other different initial conditions. These other paths need not be described herein because the foregoing examples have brought out the operations which occur in every possible state of controller 40 involved in the STK ADJ (0,0) operation. In summary, FIG. 6 shows that controller 40 will proceed through states T20-T31 a sufficient number of times so as to push down the words from A register 10 and B register 12 and will reset the AROF11 and BROF13 flip-flops so as to indicate that their associated registers are empty.

Figure 8:
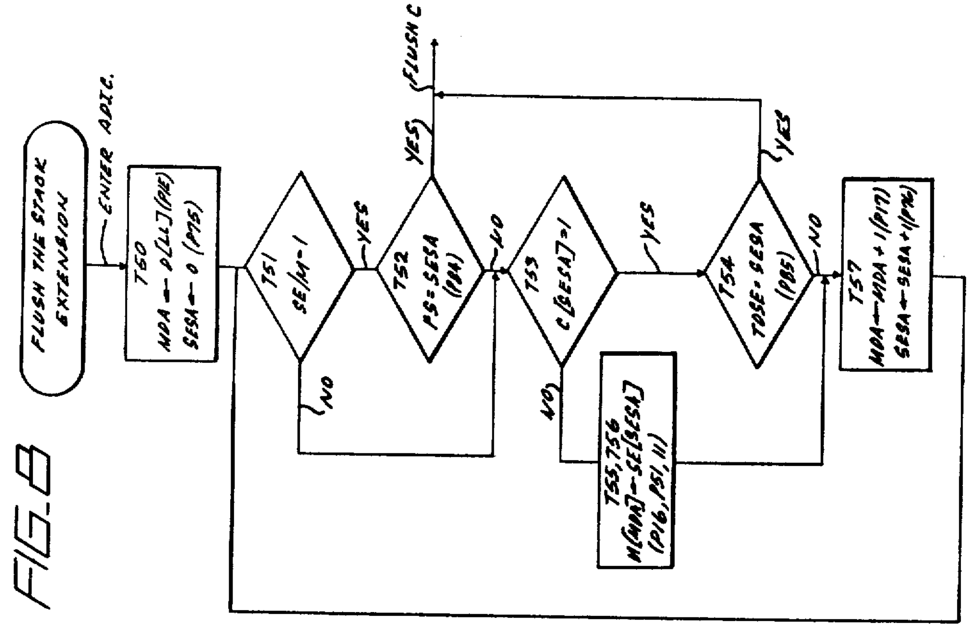
FIG. 8 is a flow diagram showing the manner in which the stack extension is flushed during execution of the ENTER operator.
Figure 7:
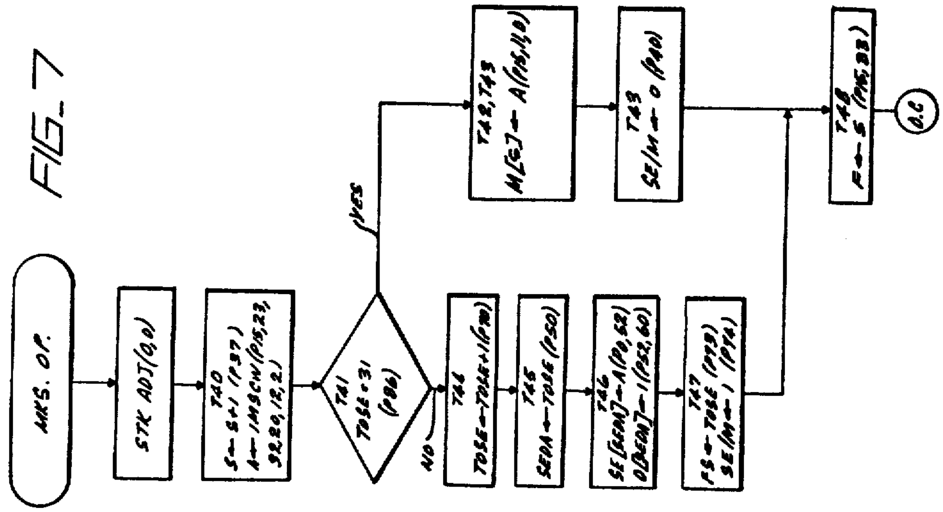
FIG. 7 is a flow diagram of the Mark Stack (MKS) operation of the present invention.
Figure 9:
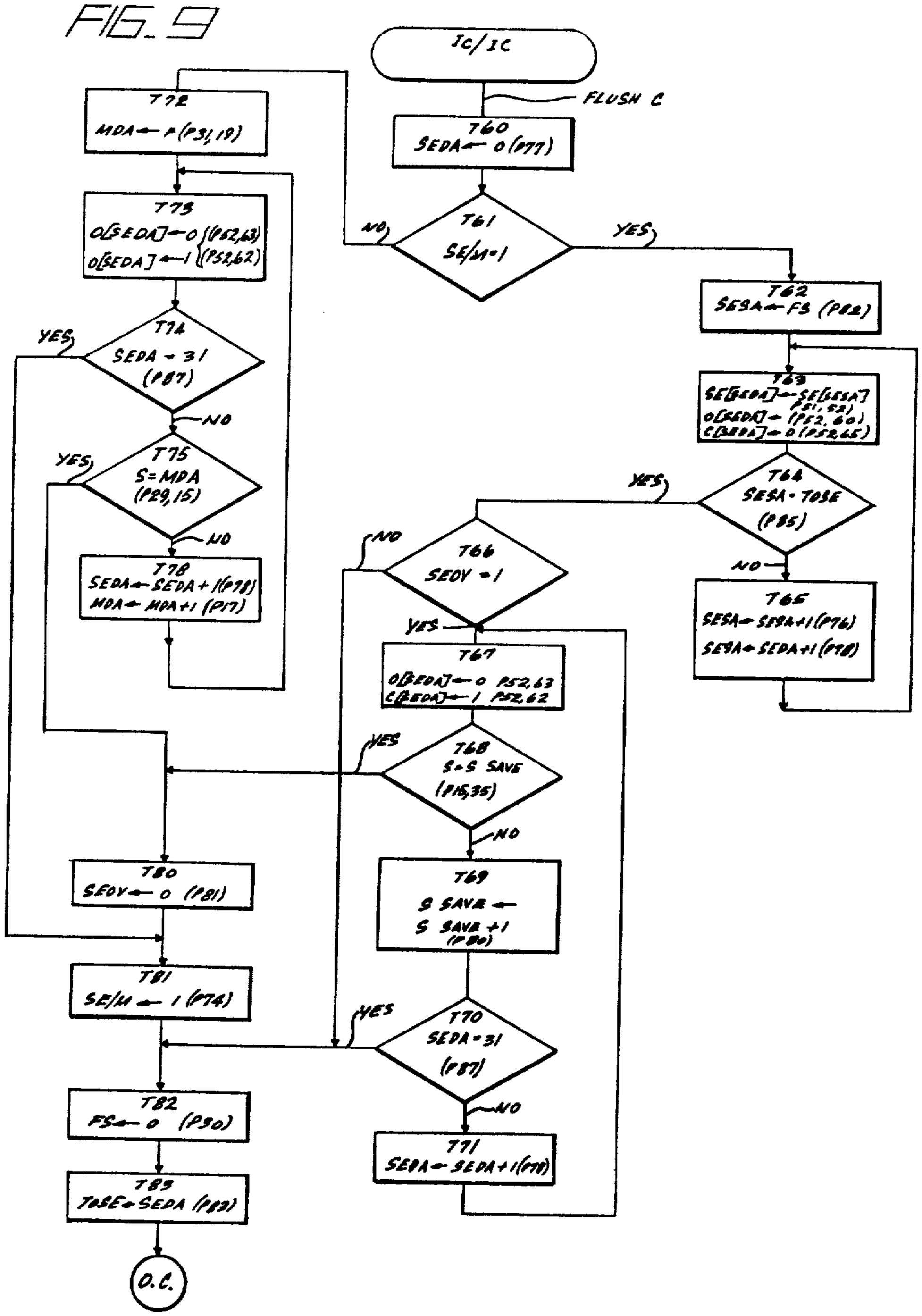
FIG. 9 is a flow diagram of an operation called an C/IC transfer and shows the manner in which words in stack are transferred internally within the stack extension memory.

FIGS. 7, 8, and 9 bring out in flow chart from a sequence of events involved in preparing for the execution of a program segment for a new block. Before examining these FIGS. consider first the following general description.

The program operator repertory of the machine includes program operators entitled Value call (VALC), Name call (NAMC), Store destructive (STOD), Mark the stack (MKS), Enter, Exit, and Return. Both the VALC and NAMC operators include an address couple field that makes reference to a location within the stack. The VALC operator includes a field that orders controller 40 to cause a word within the referenced location to be brought up to A register 10. The NAMC operator contains a field that orders controller 40 to cause an IRW to be placed in A register 10. The IRW so placed in A register 10 will include the address couple field of the NAMC operator. The STOD operator includes a field that orders controller 40 to store a word in A register 10 into a location pointed to by an IRW in B register 12. The STOD operator will be inserted in the program sequence following a NAMC operator. Thus the combination of a NAMC and an STOD operator causes a word to be stored in a stack location referred to by the address couple field of the NAMC operator. The MKS operator causes controller 40 to place an IMSCW at the top of the stack. The MKS operator is placed in the program sequence when it is desired to enter a new block. A new block is actually entered in response to the Enter operator and returned from in response to either an Exit operator or a Return operator.

Briefly, the sequence of events that occur in anticipation of entering a new procedural block are as follows: The MKS operator causes an IMSCW to be entered in the stack. FIG. 7 shows the details of this operation. Then a NAMC operator causes an IRW to be placed immediately above the IMSCW. This IRW will contain address information pointing to the PCW for the new procedure. After the IRW is placed in the stack a series of VALC operators will bring parameters to the top of the stack. These are the parameters that will be passed to the new procedure. Then the ENTER operator is executed. One phase of the ENTER operator execution is called flushing the stack extension and is shown in detail in FIG. 8. A later phase is called an IC/IC transfer and is shown in detail in FIG. 9.

Following the IC/IC transfer, execution of the ENTER operator proceeds through a series of phases in substantially the same manner as disclosed in U.S. Pat. No. 3,548,384. These other phases are not described in detail herein as they are not necessary to an understanding of the present invention. Briefly, these phases involve obtaining a Program Control Word (PCW); distributing the various fields of the PCW into appropriate registers; generating a Return Control Word (RCW) and placing the RCW into the stack; updating the address environment list by converting the IMSCW into an MSCW (i.e., changing the environment bit and adding the DISP field; updating the display registers; and setting the Program Base Register (PBR) to point to the base of the program segment which is being entered.

Consider now FIG. 7 in connection with FIGS. 1 and 2. FIG. 7 is a flow chart illustrating the sequence of operations involved in the mark stack operation. The mark stack operation is performed when entry into a new program block is anticipated and causes an IMSCW to be inserted into the stack.

At the beginning of the mark stack operation a STK ADJ (0,0) operation is performed to clear the A register 10 and the B register 12. When the adjust complete signal is produced controller 40 enters state T40 and produces control signals P37, P15, P23, P32, P20, P12, and P2. Briefly these control pulses cause S register 24 to be incremented by '1' and cause an incomplete mark stack control word to be stored in A register 10, that is S ← S + 1 and A ← IMSCW. P37 is applied to the count-up input of S register 24, thereby causing the address stored therein to be incremented by '1'. P15 is applied to gate 69 which gates the address stored in S register 24 onto the b8 bus. P23 is applied to gate 63 which causes the address carried by the b8 bus to be applied to one input of address adder 26. P32 is applied to gate 53 which causes the address stored in F register 52 to be applied to bus b9. P20 is applied to gate 64 which causes the address carried by bus b9 to be applied to the other input of address adder 26. Address adder 26 subtracts the address stored in F register 52 from the address stored in S register 24 to produce the DF field which is necessary to form an IMSCW. The DF field produced by address adder 26 is applied to gate 36. P12 is applied to gate 36 causing the DF field to be gated onto the b4 bus. P2 is applied to gate 16 and gates the DF field which is carried by the b4 bus into A register 10.

Following state T40 controller 40 enters the state T41 and makes a check of the address stored in TOSE74. To that end controller 40 produces pulse P86 which applied to gate 89 which couples the address stored in TOSE74 to decoder 88. The output of decoder 88 indicates whether the address stored in TOSE74 is equal or not equal to 31. Following state T41 controller 40 takes one of two alternate paths. If the address stored in TOSE74 is equal to 31 then the stack extension memory is full and there is no room to store the IMSCW therein. Therefore, controller 40 branches to states T42 and T43. During states T42 and T43, controller 40 causes the IMSCW stored in A register 10 to be written into memory 20 at the address pointed to by S register 24. That is, M[S] ← A. To this end, controller 40 produces control signals P15, P11, and P0. P15, P11, and P0 are applied to gates 69 and 35, 34, and 14 respectively. During state T43, controller 40 also produces control signal P40 which is applied to the reset input of SE/M83. When reset, SE/M83 indicates that the IMSCW for the program block which is about to be entered is not stored in the stack extension memory, but rather is stored in memory 20. Following state T43 controller 40 enters states T48 and produces control signals P15 and P33. These control signals are applied to gates 69 and 54 and cause the address stored in S register 24 to be transferred into F register 52. That is, F ← s. By virtue of this operation, the address stored in the F register 52 has been updated so that it points to the memory location 22 storing the IMSCW word.

Consider now the alternate path following state T41 which occurs in the event that TOSE74 stores an address less than 31. In this event controller 40 enters state T44 and produces control signal P70. P70 is applied to the count up input of TOSE74, thereby incrementing the address stored therein by '1'; that is, TOSE ← TOSE + 1. Following state T44 controller 40 enters state T45 and produces control signal P50. P50 is applied to gates 73 and 81, and causes the address stored in TOSE74 to be transferred into SEDA80; that is SEDA ← TOSE.

Next, controller 40 enters state T46 and produces control signals P0, P52, and P60. These control signals cause the IMSCW stored in A register 10 to be written into the stack extension memory; that is SE[SEDA] ← A. Also the occupancy indicating means is set so as to indicate that the IMSCW has been written into stack extension memory, that is, 0 [SEDA] ← 1. To this end, P0 is applied to gate 14 and P52 is applied to gates 79 and 97. When so enabled, these gates cause the IMSCW stored in A register 10 to be coupled to the b4 bus and then written into a location within the stack extension memory pointed to by the SEDA80. P60 is combined in the appropriate gating network 90 to mark the appropriate occupancy indicating flip-flop that the IMSCW has been written in its associated stack extension register.

Following state T46 controller 40 enters state T47 and produces control signals P73 and P74. P73 is applied to gates 73 and 72 thereby causing the address stored in TOSE74 to be transferred to FS71; that is FS ← TOSE. The purpose of this operation is to save the address within the stack extension memory which stores the IMSCW. P74 is applied to the set input of SE/M83 thereby causing that flip-flop to indicate that the IMSCW is stored in the stack extension memory and not in memory 20. Following state T47 controller 40 enters state T48 and proceeds as described above.

Summarizing, the MKS operation causes the processor to store in IMSCW either in memory 20 or the stack extension memory as the current top of stack. The IMSCW will be stored in the memory 20 only if there is no empty location within stack extension memory available for storing the IMSCW.

Consider now FIG. 8 in connection with FIGS. 1 and 2. FIG. 8 is a flow diagram of the operation called flushing the stack extension. As indicated in FIG. 8 the flushing of the stack extension operation occurs during the execution of the ENTER operator and commences after the ADJ.C. signal is formed. Following the ADJ.C. signal, controller 40 enters state T50 and produces control signals P18 and P75. P18 is applied to display register memory 55 and causes a selected one of the display register to deliver the address it stores to MDA register 66. P75 is applied to a reset input of SESA77 causing the address stored in SESA77 to be reset to all zeros so as to point to the base location of the stack extension memory (SER30-0). This operation is symbolized in FIG. 8 as MDA ← D[LL] and SESA ← '0'.

Following state T50 controller 40 enters state T51 and causes a check to be made of SE/M83. If SE/M is equal to '1' controller 40 enters state T52, otherwise controller 40 branches to state T53.

During state T52, the address stored in SESA77 is compared against the address stored in FS71. To that end P84 is applied to gate 85 thereby applying the address stored in SESA77 to be applied to compare circuit 84 and be compared against the address stored in TOSE74. When the two addresses are equal, compare circuit 84 forms a '1' signal on its equal line and when the two address signals are different compare circuit 84 forms a '1' on its ≠ line. The = and ≠ output lines from compare circuit 84 are coupled back to controller 40. If during state T52 controller 40 receives a '1' signal on the = line, then controller 40 forms a flush complete signal (FLUSH.C.) to indicate that all of the words within the stack extension have been transferred over to memory 20. Otherwise controller 40 enters state T53 and causes a check to be made of the copy indicating means associated with the stack extension memory. If during state T53 controller 40 finds that a valid copy of a word stored in a stack extension memory exists in memory 20, there is no need to transfer the word over to memory 20 and and consume the time required for a main memory access. However, if no such valid copy exists a main memory access is required.

In the event such a main memory access is required controller 40 enters states T55 and T56 and forms control signals P16, P51 and P11. Briefly these control signals cause the transfer of a word from a selected stack extension register over to the main memory 20. That is, M[MDA]← SE[SESA]. Note that the first time controller 40 enters state T55 the address in MDA register 66 is equal to the address derived from the display register memory 55; also note that SESA is pointing to SER30-0 or the base location within a stack extension memory. Thus the first time controller 40 enters state T55 and T56 an MSCW stored in SER30-0 will be transferred over to a location in memory 20 which has been reserved for storing the MSCW.

P16 is applied to gate 35 causing the transfer of the address in MDA register 66 to be gated into MAR23. Simultaneously controller 40 forms a write signal on the ACR bus coupled to RW27. P51 is applied to gate 96 so as to gate the address stored in SESA77 to SM94. SM94 forms a control signal on its R0 line and causes gate 91-0 to transfer the MSCW stored in SER30-0 into the b4 bus. The b4 bus carries the MSCW to the input of gate 34 and P11 causes the gate to apply the MSCW to the b5 bus, which carries it to MIR21. After the MSCW is received by MIR21 it is written into the memory location 22 identified by the address which was previously transferred to MAR23.

Following the transfer of MSCW into memory 20, controller 40 enters state T57 and produces control signals P17 and P76. P17 is applied to the count-up input of MDA66 causing the address stored therein to be incremented by 1. P76 is applied to the count-up input of SEAS77, causing the address stored therein to be incremented by '1'. Following state T57 controller 40 returns to state T51 again and proceeds as described above. That is, controller 40 enters in sequence states T51, T52, and T53. Again, if during state T53 controller 40 determines that no valid copy of a stack word stored in a stack extension memory exists in memory 20 another main memory access is required and therefore controller 40 enters state T55 and T56 again. The second time controller 40 enters states T55 and T56 it will cause the transfer of an RCW from the stack extension memory over to memory 20. This is true because the register within the stack extension memory which is now pointed to by SESA is the SER30-1 register. Also the location in memory 20 to which the RCW is transferred is the next sequential location above the location now containing the MSCW.

Controller 40 will flow through the path defined by state T51 through T57 a sufficient number of times to read out of the stack extension memory all of the stack words related to the previous block and transfer these words over a memory 20 and store them in sequential locations.

As indicated in FIG. 8, there are two ways in which the process of flushing the stack extension can be terminated. If during state T52 controller 40 determines that the address stored in SESA77 is equal to the address stored in FS register 71, controller 40 forms the flush complete signal. The reason why controller 40 terminates the flushing of the stack extension process at this point is that the only words which should be transferred from the stack extension memory to memory 20 are those words which are related to the stack build-up by the previous program segment and those words which are associated with the program segment which is being entered should not. Recall that FS register 71 has been set at a previous stage during a mark stack operation so as to save the address of the stack extension memory storing the IMSCW for the program segment which is about to be entered. Thus when controller 40 determines that SESA77 has been counted up to equal the address stored FS71 it terminates the flushing of the stack extension process.

As an alternative way of terminating the flushing of the stack extension process, controller 40 makes a test storing a state T54 to determine whether or not SESA77 has been counted up to store an address equal to the address stored in TOSE74. Thus, in the event that the IMSCW was not stored in the stack extension memory during the mark stack operator but instead was stored as an overflow word in memory 20, the flushing of the stack extension process is terminated after all 31 words stored in a stack extension memory have been flushed out.

Consider now FIG. 9 in connection with FIGS. 1 and 2. FIG. 9 is a flow diagram of the events which take place during the execution of the ENTER operator following the formation of the flush complete signal. The operation depicted in FIG. 9 is denominated an IC/IC transfer. The primary purpose of this operation is to take the words which are related to the program segment about to be entered and transfer them down to the base of the stack extension memory, where they will be captured during the execution of the program segment about to be entered.

At the outset of the IC/IC transfer operation, controller 40 enters state T60 and forms control signal P77. P77 is applied to the reset input of SEDA80 thereby causing the address stored therein to equal all zeros.

Next controller 40 enters state T61 and causes a check to be made of SE/M83. If the Se/M83 flip-flop is in its '1' state thereby indicating that the most recent MSCW is stored within a stack extension memory, controller 40 branches to state T62. Alternatively, controller 40 branches to state T72.

During state T62 controller 40 forms control signal P82 which causes the contents of FS71 to be transferred to SESA77 through gate 70; that is, SESA FS. Following state T62 controller 40 enters state T63 and produces control signals P51, P52, P60 and P65. Briefly, these control signals cause a word stored in a selected stack extension register to be transferred into another one of the stack extension registers. That is, SE[SEDA] ← SE[SESA]. Also, the occupancy and copy indicating means are appropriately adjusted. That is, O[SEDA] ← '1', and C[SEDA] ← O. It should be noted that the first time controller 40 enters state T63, the word transferred within the stack extension memory will be the IMSCW and the IMSCW will be transferred from the register pointed to by FS71 down to SER30-0.

Next, controller 40 enters state T64 and causes a check to be made to determine whether SESA77 stores an address equal to the address stored in TOSE74. To that end controller 40 forms control signal P85 which is applied to gate 85. Thus compare circuit 84 receives as its inputs the address stored in SESA77 and the address stored in TOSE74. Compare circuit 84 responds by producing a '1' signal on either its = or ≠ line.

In the event that the address is stored in SESA77 and TOSE74 are different controller 40 responds by entering state T65 and forming control signals P76 and P78. Briefly these control signals cause the addresses stored in SESA77 and SEDA80 to be incremented by '1'. That is, SESA ← SEAS+1, SEDA ← SEDA+1. Following state T65 controller 40 loops back to enter state T63 again and proceeds as described above. Thus controller 40 flows through a loop formed by states T63-T65-T63 a sufficient number of times until SESA77 has been counted up to equal the address stored in TOSE74 and then terminates this loop.

At the termination of the above-described loop, controller 40 enters state T66 and causes a check to be made of SEOV82. In the event that SEOV82 is forming a '0' signal thereby indicating that there has been no overflow of stack words out of the stack extension memory, controller 40 branches to state T82. During state T82 controller 40 forms control signal P30 which is applied to the reset input of FS71, thereby causing that register to be reset to all zeros. Following state T82 controller 40 enters state T83 and produces control signal P83. P83 is applied to gate 75 which responds to transfer the address stored SEDA80 into TOSE74. That is TOSE ← SEDA.

Return now to the alternate path which controller 40 takes in the event that there has been an overflow out of the stack extension memory. In this event, controller 40 enters state T67 from T66 instead of going to state T82. During state T67 controller 40 forms control signals P52, P63 and P62. Briefly, controller 40 during this state causes the occupancy indicating means and the copy indicating means to be appropriately adjusted. That is, O[SEDA] ← '0', and C[SEDA] ← 1. The indicating means are adjusted in this manner so as to reserve a stack extension register for possible future storage of a stack word residing in memory 20. It should be noted that the first time controller 40 enters state T67 S Save register 25 will be pointing to the location of memory 20 which was the first location into which an overflow word was stored.

Following state T67 controller 40 enters state T68 and forms control signals P15 and P35. Briefly, these control signals cause a check to be made to determine whether S register 24 is storing an address equal to the address word in S Save register 25. To that end, P15 is applied to gates 69 thereby causing the address stored in S register 24 to be applied to the b8 bus and be carried to one input of gate 59. P15 also enables gate 69 which responds to apply that address to one input of compare circuit 57. P35 is applied to gate 68 thereby causing the address stored in S register 25 to be applied to the b11 bus which is connected to one input of gate 58. P35 is also applied to the control input of gate 58 thereby causing the address stored in S Save register 25 to be applied to the other input of compare circuit 57. If two addresses applied to the inputs of compare circuit 57 are equal, it applies a '1' signal to its equal line, otherwise it applies a '1' signal to its ≠ line. The = and ≠ lines are coupled to controller 40 so as to inform controller 40 what state to enter next. If during state T68 controller 40 determines that the address stored in S register 24 is equal to the address stored in S Save register 25, it knows that sufficient memory space has been reserved in the stack extension memory for possible future storage of all of the overflow words and therefore it branches to state T80. During state T80 controller 40 produces control signal P81 which is applied to the reset input of SEOV82. Alternatively, following state T68 controller 40 enters state T69 and produces control signal P80. P80 is applied to the count-up input of S Save register 25, thereby causing the address stored therein to be incremented by '1'. That is, S Save ← S Save + 1. Following state T69 controller 40 enters state T70 and produces control signal P87. P87 causes a check to be made to determine whether or not the address stored in SEDA80 is equal to 31. In the event that the address stored in SEDA80 is equal to 31 controller 40 branches to state T82 and proceeds as described above. Otherwise controller 40 branches to state T71 and produces control signal P78. Briefly, during state T71 the address stored in SEDA 80 is incremented by '1'. That is, SEDA ← SEDA + 1. Following state T71 controller 40 loops back to enter state T67 and proceeds as described above. Thus it can be seen that a loop is formed comprising states T67-T71-T67. Each traversal of this loop causes an additional stack extension register to be reserved for possible future storage of stack words residing in memory 20.

Return now to the events which follow state T61 when controller 40 determines that SE/M83 is in its '0' state. In this event controller 40 enters state T72. During state T72 the address stored in F register 52 is transferred into MDA66; that is MDA ← F. To that end, controller 40 produces control signals P31 and P19. P31 is applied to gate 53 which causes the address stored in F register 52 to be applied to the b8 bus. The b8 bus carries this address to gate 65. P19 is applied to gate 65, thereby causing this address to be loaded into MDA66.

Following state T72, controller 40 enters a loop comprising states T73-T76-T73. Briefly, in preceeding through this loop controller 40 will cause memory space to be reserved in the stack extension memory for possible future storage of the stack words residing in memory 20 relating to the program segment which is about to be entered. To that end, controller 40 adjusts the occupancy and copy indicating means in the following described manner.

Controller 40 enters state T73 and produces control signals P52, P66, and P63. P52 and P63 combine to reset a selected occupancy indicating flip-flop. That is, O[SEDA] ← 0. P52 and P62 combine to set a selected copy indicating flip-flop. That is, C[SEDA] ← 1.

Next, controller 40 enters state T74 and causes a check to be made to determine whether or not the address stored in the SEDA80 is equal to 31. To this end, controller 40 produces control signal P87 which is applied to gate 89. In response gate 89 applies the address stored in SEDA80 to decoder 88. The first time through the loop SEDA will be equal to 0 by virtue of the resetting of SEDA80 during state T60. Therefore decoder 88 produces a '1' signal on its ≠ 31 line and controller 40 will respond thereto to enter state T75. During state T75 controller 40 causes a check to be made to determine whether or not the address stored in MDA66 is equal to the address stored in S register 24. To that end controller 40 produces control signals P29 and P15. Gates 69, 59, 58 and compare circuit 57 respond thereto and a '1' signal is applied either to the = or ≠ line connecting compare circuit 57 to controller 40.

If the address stored in MDA66 is not equal to the address stored in S register 24, controller 40 next enters state T76. During state T76 the addresses stored in SEDA80 and MDA66 are incremented. That is, SEDA ← SEDA + 1 and MDA ← MDA + 1. Following state T76 controller 40 re-enters state T73 and proceeds through the loop again.

Each traversal of this loop causes the addresses stored in MDA66 and SEDA80 to be counted up. Eventually either SEDA80 will be counted up to 31, in which case decoder 88 produces a '1' on its = 31 output, or MDA66 will be counted up to equal the address stored in S register 24, in which case compare circuit 84 produces a '1' on its = output.

In the event that SEDA80 is counted up to 31, controller 40 branches out of the loop from state T74 and enters state T80. In the event that MDA66 is counted up to equal S register 24, controller 40 branches out of the loop from state T75 and enters state T82. The sequence of events occurring and following states T80 and T82 have been described above.

Figure 10:
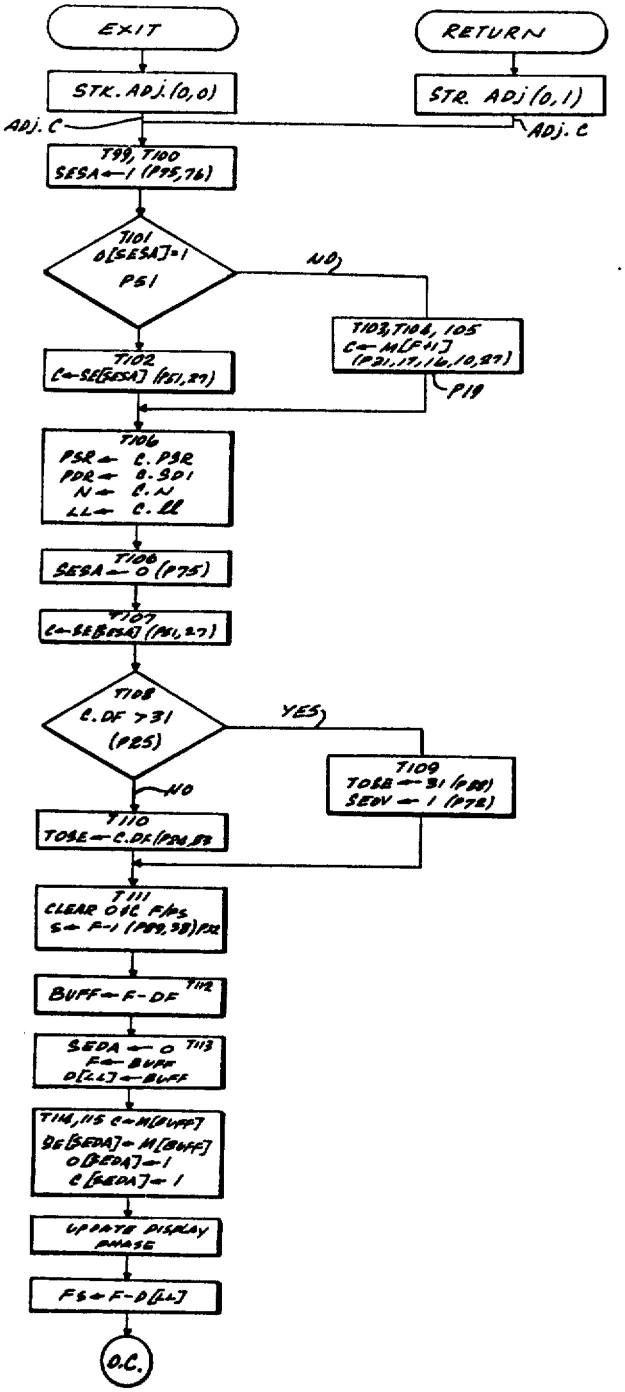
FIG. 10 is a flow diagram of the operations involved n executing the EXIT and RETURN operators.

Consider now FIG. 10 in connection with FIGS. 1 and 2. FIG. 10 is a flow chart of the manner in which the EXIT and RETURN program operators are executed. The RETURN program operator is placed at the end of program segments for procedural blocks which return a value to the program block which calls the procedural block. The EXIT program operator is placed at the end of other types of program segments. The execution of both the EXIT and RETURN program operators involves a number of phases, such as a phase wherein the display register memory 55 is updated. Such phases are not pertinent to the present invention and have been fully disclosed in the above identified U.S. Pat. No. 3,548,384. Thus those phases of the execution of these program operators will not be described in detail herein.

The chief difference between the execution of the EXIT program operator and the RETURN program operator resides in the initial phase. In executing an EXIT operator initially a STK ADJ (0,0) is performed so as to clear A register 10 and B register 12. On the other hand, the initial phase of a RETURN program operator involves STK.ADJ (0,1) operation. This latter operation is essentially the same as STK ADJ (0,0) operation. The only difference resides in the fact that in the STK ADJ (0,0) operation for the initial phase of the return program operator, the word stored in B register 12 is not pushed down into the memory stack.

In any event, following the stack adjustment operation occurring at the initial phases of both the EXIT program operator and the RETURN program operator an ADJ.C. signal is produced. Following this ADJ.C. signal, the execution of the EXIT program operator is identical to that of the RETURN program operator.

First, controller 40 enters states T99 and T100 and causes the SESA77 register to point to SER30-1, that is, SESA ← 1. To that end, controller 40 produces control signals P75 and P76. P75 is applied to the reset input of SESA77 thereby causing the address stored therein to change to all zeros. Next, P76 is applied to the count-up input of SESA77, thereby causing the address stored therein to be incremented by one, so that now SESA77 points to SER30-1.

Next, controller 40 enters state T101. During state T101, controller 40 makes a check to determine whether or not an RCW is stored in SER30-1. To that end, controller 40 produces control signal P51. P51 is applied to gates 76 and 96 and causes the address stored in SESA77 to be applied to SM94. In this case, the address stored in SESA77 is the address of SER30-1. Consequently, SM94 forms a '1' on its R1 output. The R1 output is applied to gate 92-1 (not shown), thereby causing the OF-1 output to be applied to the input of decoder 98. Decoder 98 forms a '1' signal on one of its output lines S0-S3, which are coupled back on the S bus to controller 40.

Consider first the alternate path controller 40 takes following state T101 in the event that the RCW is stored in the stack extension memory. In this event, controller 40 enters state T102 and causes the RCW to be read out of the stack extension memory and stored into C register 61, that is C ← SE[SESA]. To that end, controller 40 produces control signals P51 and P27. P51 is applied to gates 76 and 96 thereby causing the address stored in SESA77 to be applied to SM94.

Again, SM94 forms a control signal on its R1 output line which is applied to gate 91-1 (not shown). Thus the RCW stored in SER30-1 is coupled to the b4 bus. The b4 bus connects to the input of gate 60. P27 is applied to the control input of gate 60 thereby causing the word the RCW carried by the b4 bus to be loaded into C register 61.

Consider now the alternate path controller 40 takes following state T1 in the event that the SER30-1 register has been reserved for storing but does not actually store the RCW. In this event, controller 40 branches to states T103, T104, and T105. Briefly during these states controller 40 causes the RCW stored at the location immediately above the location pointed to by F register 52 to be read out of memory 20 and loaded into C register 61. That is, C ← M(F + 1). To this end, controller 40 produces control signals P31, P17, P16, P10, and P27. P31 is applied to gate 53 which responds by applying the address stored in F register 52 to be b8 bus. The b8 bus carries this address to the input of gate 65. P19 is applied to the control input of gates 65, thereby causing the address carried by b8 bus to be loaded into MDA register 66. Thus at this point the address of memory 20 which has been reserved for storing the MSCW has been loaded into MDA register 66. P17 is applied to the count-up input of MDA register 66, thereby causing the address stored therein to be incremented by one. Thus at this point MDA register 66 points to the address of memory 20 which is reserved for storing RCW. P16 is applied to gate 35 which responds by causing the address of the RCW to be gated from MDA registers 66 into MAR23. Now controller 40 forms a read signal and applies it to the ACR bus which is coupled to RW27 of memory 20. In response, the RCW is read out of a memory location 22 and loaded into MIR21. P10 is applied to gate 33 thereby causing the RCW to be brought from MIR21 to bus b4. Bus b4 carries the RCW to the input of gate 60. P27 enables gate 60 to transfer the RCW carried by bus b4 into C register 61. Thus it can be seen that following either state T102 or state T105 an RCW has been loaded into C register 61.

After either state T102 or state T105 controller 40 enters state T106. Briefly during state T106 controller 40 causes the various fields of the RCW to be distributed to the temporary storage registers shown generally at 50. That is, PSR ← C.PSR, PDR ← C.SDI, N ← C.N, LL ← C.*ll*. The purpose of these transfers is to update the processor program pointing means so as to point to the program segment which will receive control of the processor after the execution of the EXIT operator or RETURN operator. Also during state T106 controller 40 causes SESA77 to point SER30-0, that is SESA ← 0. To these ends controller 40 produces control signals P75 and P90. P75 is applied to the reset input of SEDA77 thereby causing the address stored therein to change to all zeros. P90 is applied to gates 46, 48 and 49 so as to distribute the various fields of the RCW.

Following state T106 controller 40 enters state T107 and causes the MSCW to read out of the stack extension memory and loaded into C register 61, that is C ← SE[SESA]. To that end, controller 40 produces control signals P51 and P27. P51 is applied to gates 76 and 96 thereby causing the address word in SESA77 (which now points to SER30-0) to be applied to SM94. SM94 responds by forming a '1' signal on its R0 output line. The '1' signal on the R0 output line enables gate 91-0 and in response gate 91-0 transfers the MSCW from SER30-0 to the b4 bus. The b4 bus is connected to the input of gate 60. P27 is applied to the control input of gate 60, thereby causing the MSCW carried by the b4 bus to be gated into C register 61.

Next, controller 40 enters state T108. During state T108 controller 40 causes a check to be made whether the stack depth of the record of execution of the program segment which is about to receive control of the processor is greater than 31. To that end controller 40 produces control signal P25. P25 is applied to gate 62 which responds by coupling the DF field of the MSCW now stored in C register 61, to the input of decode circuit 44. In response decode circuit 44 produces a '1' signal on either a > or a ≤ line for application to controller 40. Based on the result of this check controller 40 follows one of two alternate paths.

In the event that stack depth is greater than 31 controller 40 enters state T109. Briefly during state T109 controller 40 causes the address stored TOSE74 to be set to 31 and causes SEOV82 to be set to its '1' state. That is TOSE ← 31, SEOV ← 1. To that end controller 40 produces control signals P88 and P72. P88 is applied to the set input of TOSE74, thereby causing each flip-flop stored therein to be set to its '1' state. P72 is applied to the set input of SEOV82 thereby causing that flip-flop to enter its '1' state and produce a '1' signal on its SEOV output, thereby indicating that an overflow condition exists with respect to the stack for the program segment which is about to receive control of the processor.

Alternatively, following state T108 controller 40 enters state T110 in the event that the above-mentioned stack depth is not greater than 31. Briefly, during state T110 controller 40 causes the DF field of the MSCW now stored in C register 61 to be gated into TOSE74, that is TOSE ← C.DF. To that end controller 40 produces control signal P24. P24 is applied to gates 62 and 75 which cause the DF field to be coupled from C register 61 onto bus b30 and be stored in TOSE74. Following either state T110 or state T109 controller 40 enters state T111. Briefly, during state T111 controller 40 causes all of the occupancy and copy indicating flip-flops to be reset and causes the address stored in S register 24 to be updated. To these ends controller 40 produces the CLEAR signal and control signals P89, P32 and P38. The CLEAR signal is applied to the gates 90-0 through 90-31 which respond thereto to reset each of the copy indicating and occupancy indicating flip-flops. P32 is applied to gate 53 which responds thereto to gate the contents of F register 52 onto the b9 bus. P89 is applied to gate 47 which responds thereto to gate the contents of the F register 52 now carried by bus b9 into S register 24. P38 is applied to the countdown input of S register 24 so as to decrement its address by 1. Therefore, after this operation, S register 24 has been updated so that it now stores the address of the memory location immediately below the MSCW for the program block being exited from. That is, S ← F − 1.

Following state T111 controller 40 enters state T112. During state T112 controller 40 causes address adder 26 to calculate the absolute address of the next preceding MSCW in the stack history list and to store this calculated address in the BUFF register within block 50. That is BUFF ← F − DF. To this end, controller 40 produces control signals P22, P32, P20, P12, and P96. P32 is applied to gate 53 which responds thereto to apply the address stored in F register 52 to the b9 bus. P20 is applied to gate 64 which transfers the address carried by the b9 bus to one input of address adder 26. The other input of address adder 26 is derived from C register 61 and is gated thereto through gates 62 and 63 in response to P22. Also, controller 40 produces the SUBTRACT control signal which is applied to address adder 26 to place it in its subtract mode. The output of address adder 26 is applied to gate 63 and P12 enables that gate to apply the calculated address to the b4 bus. The b4 bus is connected to gate 49 which is enabled by P96 so as to store the calculated address into the BUFF register within block 50.

Next controller 40 enters state T113. Briefly during state T113 controller 40 causes the SEDA80 register to point to the base location of the stack extension memory and causes the address now stored in the BUFF register to be transferred into F register 52 and into the D[LL] register within display register memory 55. That is, SEDA ← 0, F ← BUFF, and D[LL] ← BUFF. To this end, controller 40 produces control signals P77, P92, P33, and P18. P77 is applied to the reset input of SEDA80. P92 is applied to gate 51 so as to gate the address stored in the BUFF register on to the b8 bus. The b8 bus carries this address to gate 54 and to the display register memory 55. P33 is applied to gate 54 so as to gate this address in the F register 52 and P15 is applied to display register memory 55 so as to gate this address into the D[LL] register.

Next, controller 40 enters states T114 and T115. Briefly, during states T114 and T115 controller 40 causes the next MSCW within the stack history list to be read out of memory 20 and causes this MSCW to be stored into C register 61 and into the stack extension memory. Also controller 40 causes the occupancy and copy indicating flip-flops to be appropriately marked so as to indicate that the MSCW is stored therein. To that end controller 40 produces control signals P92, P15, P10, P27, P52, and P61. P92 is applied to gate 51 so as to gate the address stored in BUFF register onto the b8 bus which carries this address to gate 35. P15 is applied to gate 35 so as to gate this address into MAR23. Also controller 40 forms a read signal which is applied to the ACR bus and R/W27 responds thereto to read out the MSCW from one of the memory locations 22 as selected by the address now stored in MAR23. This MSCW is transferred into MIR21. P10 is applied to gate 33 so as to transfer the address now stored in MIR21 onto the b4 bus. The b4 bus carries the MSCW to the stack extension memory and also to gate 60. P27 is applied to the gate 60 so as to transfer the MSCW into C register 61. P52 is applied to gates 79 and 97 so as to gate the address stored in SEDA80 to SM95 which responds to form a '1' signal on its W0 output line. The W0 output line is coupled to gate 93-0 which responds to the '1' signal carried by it to store the MSCW carried by the b4 bus into SER30-0. P61 is applied to the gate 90-0 through 90-31 and cooperates with the W0 signal to cause OF-0 and CE-0 to be set to their '1' states. The operations occurring during states T114 and T115 are symbolized in FIG. 10 as C ←—— M[BUFF], ← SE[SEDA] ← M[BUFF], O[SEDA] ← 1, C[SEDA] ← 1.

Following state T115 controller 40 enters its update display phase which need not be discussed in detail herein. Following completion of the updating of the display registers during this update display phase, controller 40 enters state T116. During state T116 controller 40 causes address adder 26 to calculate the stack depth of the stack for the program block which is being exited to and stores this stack depth into FS71. That is, FS ← F - D[LL]. To that end, controller 40 produces control signals P18, P21, P31, P12, and P97. P18 is applied to display register memory 55 so as to cause D[LL] register to transfer the addresses stored to the bus coupled to gate 64. P21 is applied to gate 64 so as to gate this address to one input of address adder 26. P31 is applied to gate 53 which responds thereto to apply the address stored in F register 52 to the b8 bus. The b8 bus carries this address to gate 63. P23 is applied to gate 63 so as to gate this address to the other input of address adder 26. Also controller 40 forms the SUBTRACT signal so as to place address adder 26 into its subtract mode. Consequently address adder 26 responds to calculate the new stack depth and apply this calculated number to gate 36. T12 is applied to gate 36 to cause this calculated number to be placed onto the b4 bus. The b4 bus carries this calculated number to gate 72 within block 2 and P97 enables that gate to store this calculated number into FS71. Following state T116 controller 40 forms the operation complete (OC) signal.

Consider now FIG. 11 in connection with FIGS. 1 and 2. FIG. 11 is a flow chart of the operations involved in executing a value call operator. The value call operator is used for selecting a word which was previously placed in the stack and bringing that word up to the A register 10.

States T130-T138 of controller 40 are involved in the execution of the value call operator. The actual sequence of events and the time required to perform the value call operator depends upon various factors, such as whether or not A register 10 is initially available for receiving the word to be brought thereto and whether the word which is to be brought up to the A register 10 is currently stored in memory 20 or in the stack extension memory.

The initial phase of the execution of the value call operator involves the decoding of the operator by P register 28 and the transfer of the LL part and δ of the value call operator through gate 60 to C register 61. Controller 40 responds to a decoded signal from P register 28 to form control signal P26 which enables gate 60.

At the outset of the execution of value call operator, a stack adjustment operation is performed to make A register 10 available for storing a word to be brought thereto. For purposes of executing the value call operator it is immaterial whether or not a word is stored in B register 12. Consequently the stack adjustment operator performed initially during the execution of value call operator is denominated as STK.ADJ (0,2). This operation is substantially the same as the operation involved in STK ADJ (0,0). The only significant difference between the two operations is that there is no need to push down a word from B register 12. At the completion of the STK ADJ (0,2) operation an ADJ.C. signal is formed.

Following the ADJ.C. signal, controller 40 enters state T130 and produces control signal P26. P26 is supplied to gate 60 to cause the address couple field of the value call operator to be transferred to C register 61 (i.e., C ← P.*ll*, δ).

Following state T130 controller 40 enters state T131 and causes a check to be made to determine whether or not the word addressed by the address couple is within the current lexicographical level of the program segment now being executed. Also, controller 40 makes a check to determine whether or not the δ part of the address couple is less than or equal to 31. To that end controller 40 produces control signals P28 and P25. P28 is applied to gates 59 and 58, thereby causing the $LL_c$ value stored in LL register 56 to be gated to one input of compare circuit 57 and simultaneously causing the *ll* part of the address couple stored in C register 61 to be gated to the other input of compare circuit 57. Compare circuit 57 responds to form a '1' signal on either its = or ≠ line which are coupled to controller 40.

If the *ll* part of the address couple field is equal to the current lexicographical level of the program segment now being executed and if the δ part of the address couple field is less than or equal to 31, controller 40 takes alternate path and proceeds to enter state T132.

Briefly, during state T132 controller 40 causes the δ part of the address couple field stored in C register 61 to be transferred into SEDA80 and SESA77. The b30 bus connecting gate 62 to the stack extension memory carries this δ part. During state T132 controller 40 forms control signal P91. P91 is applied to gates 81 and 78, thereby causing δ part carried by the b30 bus to be gated into SEDA80 and SESA77 respectively. As shown in FIG. 11 these operations are symbolized as SEDA ← C.δ, SESA ← C.δ. Following state T132 controller 40 enters state T133 and causes a check to be made to determine whether or not the register within the stack extension memory which is addressed by the δ part of the address couple is occupied. To that end controller 40 produces P51. Thus as has been explained earlier P51 causes a selected one of the gates 92-0 through 92-31 to couple the output of an occupancy indicating flip-flop to decoder 98. Decoder 98 responds by forming a control signal on one of its output lines S0-S3 which are coupled back to controller 40. In the event that the selected stack extension register is occupied (i.e., O[SEDA] = 1) controller 40 responds by entering state T134. Briefly during state T134 controller 40 causes the word within the selected stack extension register to be read out and coupled to A register 10 (i.e., A ← SE[SESA]). To that end, controller 40 produces control signal P51 and P2. P51 is applied to gates 76 and 96 thereby causing the address stored in SESA77 to be gated to SM94. SM94 responds to form a gating signal on one of its output lines R0-31 and enable one of the gates 91-0 through 91-31. Consequently, a word stored in one of the selected stack extension register is gated on to the b4 bus and carried to the input of gate 16. P2 is applied to enable gate 16 to load the word read out from the stack extension memory to be loaded into A register 10. In addition, during state T134 controller 40 produces control signal P6 which is applied to AROF11 thereby setting that flip-flop so as to indicate that A register 10 is occupied. Following state T134 controller 40 forms an operation complete signal (OC).

If during state T133 controller 40 finds that the selected stack extension register has been reserved for storing but does not actually store the stack word, controller 40 branches to state T135. During state T135, controller 40 causes an absolute address of memory 20 to be calculated (i.e., MAR ← D[*ll*] + C.δ). To that end controller 40 produces control signals P18, P21, and P22. P18 is applied to display register memory 55 and gate 65. In response a display register within display register memory 55 selected by the *ll* part of the address couple has the register it stores gated to one input of gate 64. P21 is applied to gate 64 to enable that address to be applied to one input of address adder 26. P22 is applied to gate 63 and to gate 62 thereby causing the δ part of the address couple to be transferred from C register 61 to the other input of address adder 26. In addition, controller 40 forms the ADD control signal which is applied to address adder 26 to place it into its ADD mode. In response, address adder 26 adds the absolute address derived from the display register memory to the δ part of the address couple to form an absolute address of memory 20. P13 is applied to gates 36 and 35 thereby enabling those gates to transfer the absolute address calculated by address adder 26 up to the b6 bus which carries the absolute address to MAR23.

Following state T135 controller 40 enters state T136. Briefly during state T136 controller 40 causes the word stored in memory 20 selected by the address now stored in MAR23 to be read out and loaded into A register 10. Simultaneously, controller 40 causes this word to be written into a register within the stack extension memory corresponding to the same relative address as the relative address of memory 20 which has now been accessed. In addition, controller 40 causes the occupancy and copy indicating flip-flops of this stack extension register to be set. That is A ← M[MAR], SE[SEDA] ← M[MAR], O[SESA] ← 1, C[SESA] ← 1. To this end, controller 40 produces control signals P10, P2, P52 and P61. P10 is applied to gate 33 thereby enabling that gate to transfer the word which has been read out of memory 20 and is now stored MIR21 to be gated to the b4 bus. P2 is applied to gate 16 so as to cause that gate to load into A register 10 the word which is now carried by the b4 bus. P52 is applied to gate 79 and 97 so as to cause the addresss stored in SEDA80 to be applied to SM95. SM95 responds by forming a gating signal on one of its output lines W0-W31. The particular line carrying the gating signal causes one of the gates 93-0 through 93-31 to cause the word carried by the b4 bus to be loaded into the address stack extension register. P61 is applied to gating networks 90-0 through 90-31 and cooperates with the signal derived from SM95 so as to set both the occupancy flip-flop and the copy flip-flop associated with the stack extension register receiving the word carried by the b4 bus. Following state T136 controller 40 forms the OC signal.

Consider now the sequence of operations which follows state T131 in the event that the $LL_c$ part of the address couple field of the value call operator is not equal to the current lexicographical level of the program segment now being executed. Following state T131 controller 40 enters state T137. During state T137 the controller 40 causes the same operations which occur during state T135. That is, an absolute address of a memory location of memory 20 is calculated by address adder 26 and then stored in MAR23. Following state T137 controller 40 enters state T138 and causes the word from the address location memory 20 to be read out and loaded into A register 10 in the manner described above in connection with state T136. Following state T138 controller 40 forms the OC signal.

Figure 12:
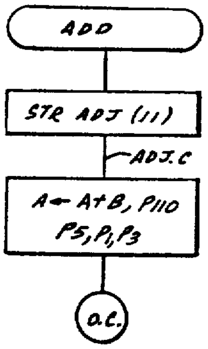
FIG. 12 is a flow diagram showing the manner in which the ADD operation is executed.

Consider now FIG. 12. FIG. 12 shows a flow chart of the execution of the ADD operator. The ADD operator is stored in the P register 28, decoded, and a signal is applied to controller 40 to notify it that an ADD program operator must be executed. In response controller 40 causes the execution of a STK ADJ (1,1) operation which has been explained in detail in connection with FIG. 5. Following the completion of the STK ADJ (1,1) operation controller 40 forms the ADJ.C. signal. Next, controller 40 produces control signals P100, P5, P1, and P3. P5 is applied to gate 17 which transfers an operand stored within B register 12 to the b2 bus which carries the operand to one input of AL15. P1 is applied to gate 14 which responds thereto to transfer another operand stored in A register 10 onto the b1 bus which carries this other operand to the other input of AL15. P100 is applied to AL15 and in response to this control signal it calculates the sum of the two operands and applies this sum onto bus b3. This operand sum carried by bus b3 is applied to gate 16 which is enabled by P3 to transfer this sum into A register 10. Following this, controller 40 forms the OC signal.

What is claimed is:

1. A programmable data processing system for executing a program which includes a plurality of blocks and which includes program operators that order entry into and exit from the blocks, the system comprising:

main memory means comprising a plurality of addressable memory means locations and having a first access time, one of the memory means locations storing a mark word for a first block which has been entered and which has ordered entry into a second block before having been exited, said mark-word-storing memory means location serving as a base location for a stack area having a depth, said stack area comprising a plurality of the memory means locations and storing a stack of words for the first block; and a data processor comprising:

a. a local memory comprising a plurality of addressable local-memory locations and having a second access time which is lower than the first access time, the local-memory locations storing a stack of words, including a mark word and a top of stack word, for the second block, the mark word stored in the local memory containing a difference value pointing to said mark-word-storing memory means location and indicating the depth of said stack area, b. register means storing a pointer to a local-memory location that stores the word at the top of the local memory stack;

c. a plurality of occupancy indicating means, each associated with a different one of the local memory locations and indicating whether its associated location stores a stack word, and each settable and resettable to indicate that its associated location respectively stores or does not store a stack word;

d. means for accessing the main memory means to obtain program operators and stack-area-stack words; and e. reserving means responsive to an obtained program operator ordering an exit from the second block for reserving local-memory locations such that each of a plurality of stack-area-stack words obtained after the second block is exited will have a local-memory location allocated for its storage, the reserving means comprising 1. for reading out said mark word stored in the local memory, 2. means responsive to said difference value contained in the read out mark word for producing a pointer and means for loading the produced pointer into the register means, and 3. means for resetting the occupancy indicating means associated with each of a plurality of local-memory locations to indicate that the associated locations have been allocated to store stack words but that the obtaining of stack words for storage therein has been at least temporarily postponed.

2. A system according to claim 1 wherein the reserving means includes means for simultaneously resetting all of the occupancy indicating means.

3. A system according to claim 2 wherein the reserving means further comprises transferring means operative to cooperate with the accessing means to transfer said mark word stored in the memory means to a predetermined local-memory location, the predetermined local-memory location being the one from which a mark word was read out, and means for setting the occupancy indicating means associated with said predetermined location.

4. A system according to claim 3 wherein the data processor further includes a first register storing a first address pointing to a memory means location indicating that the pointed to location has been allocated for storing the mark word for the second block, and includes address modifying means; and wherein the transferring means includes means for supplying to the address modifying means the difference value contained in the mark word for the second block and the first address, the address modifying means including means responsive to the supplied difference value and first address for producing an address pointing to the memory means location storing the mark word for the first block; and means responsive to the produced address for reading out the mark word for the first block. address

5. A system according to claim 4 including means for overwriting the first register with the produced address so as to deallocate the location which had been allocated for storing the mark word for the second block.

6. A system according to claim 5 wherein the data processor includes a second register storing a second address pointing to a memory means location which has been allocated for storing the word at the top of the local memory stack; and means responsive to the program operator ordering an exit from the second block for deallocating the location which had been allocated for storing the top of local-memory stack word, the last-named means including means responsive to the first address for overwriting the second register with an address pointing to the memory means location storing the stack-area stack word that is the top word in the stack area.

7. A system according to claim 6 further comprising a bistable device and wherein the reserving means includes means for detecting that said stack depth exceeds a predetermined number and means responsive to such detection for setting the bistable device.

8. A system according to claim 1 wherein the data processor further includes a first register storing a first address pointing to a location of the memory means and indicating that the pointed to location has been alocated for storing the mark word for the second block; ıddress modifying means; means for supplying to the ıddress modifying means the difference value contained in the mark word for the second block and the irst address, the address modifying means including neans responsive to the supplied difference value and irst address for producing an address pointing to the nain memory means location storing the mark word or the first block; means responsive to the produced ıddress for reading out the mark word for the first ›lock; and means for overwriting the first register with he produced address so as to deallocate the location vhich had been allocated for storing the mark word for he second block.

9. A system according to claim 8 wherein the data ›rocessor includes a second register storing a second ıddress pointing to the memory means location which ıas been allocated for storing the word at the top of the ocal memory stack; and means responsive to the program operator ordering an exit from the second block 'or deallocating the location which had been allocated 'or storing the top of local-memory stack stack word, he last-named means including means responsive to he first address for overwriting the second register vith an address pointing to the memory means location storing the stack-area stack word that is the top word n the stack area.

10. A system according to claim 9 wherein the data ›rocessor includes means for adding a new word to the ocal memory stack comprising means for incrementing he register means pointing to the local memory; means 'or incrementing the second register, thereby allocating ın additional location of the memory means; means for vriting the new word into the local memory location ›ointed to by the incremented pointer; and means for setting the occupancy indicating means associated with he local memory location written into.

11. A system according to claim 10 further comprisng a bistable device settable to indicate that all local nemory locations have been allocated and resettable o indicate that at least one local memory location has ıot been allocated; means for detecting that a new vord has been added to a predetermined location; and neans responsive to such detection for setting the bistable device.

12. A system according to claim 1 further comprising ı plurality of copy indicating means, each associated vith a different local memory location and indicating vhether its associated location stores a stack word vhich is a copy of a stack word stored in the memory neans, and each settable and resettable to indicate that he stack word stored in its associated location is or is ıot respectively such a copy; and wherein the reserving neans includes means for simultaneously resetting all ›f the copy indicating means.

13. A system according to claim 12 wherein the first ›lock is associated with a first level value and includes ›rogram operators containing address indicia comprisng a level pointer and an increment value, and wherein he second block is associated with a second level value; the combination further comprising: a level indicating register storing the second level value; a first register storing a pointer to a memory means location and ndicating that the pointed to location has been allocated for storing the mark word for the second block; means responsive to the program operator ordering an exit from the second block for loading the first level value into the level indicating register; means responsive to the value contained in the mark word read out of the local memory for producing a pointer to said mark word stored in the memory means; means for loading the produced pointer into the first register; and word copying means for writing into the local memory a copy of a word in the memory means, the word copying means comprising means responsive to said address indicia of a program operator for detecting equality between the level pointer and said first level value loaded into the level indicating register, means responsive to such detection for combining the increment value with the pointer loaded into the mark word pointing register to produce an address of memory means, means for transferring a stack word stored at the address into a location of the local memory and means for setting the occupancy and copy indicating means associated with such location.

14. A system according to claim 12 wherein the data processor includes controllable means responsive to a program operator ordering an entry into a third block for transferring the stack for the second block to the memory means; means responsive to the copy indicating means to select stack words which are copies of stack words stored in the memory means; and means responsive to such detection for disabling the transfer of such copies.

15. A data processing system comprising:

means for accumulating a stack of words including first register means, a stack storage apparatus, means for transferring words from the first register means into the stack storage apparatus for accumulation, and means for transferring accumulated words from the stack storage apparatus to the first register means in a last-in first-out order, the stack storage apparatus including a first plurality of memory locations, a second, smaller plurality of extension locations, and second register means settable to a selectable state to define an association between a selectable group of the memory locations and the extension locations such that each extension location is associated with a different one of the memory locations of the selected group to define corresponding pairs, each pair being reserved for storing a different pair of duplicate words;

means settable to identify each corresponding pair in a first condition wherein the pair stores the word for which it is reserved in the respective memory location and settable to identify each corresponding pair in a second condition wherein the pair stores the word for which it is reserved only in the respective extension location;

setting means for the second register means including means for sequentially setting the second register means so that in sequence the second register means is set to a first state, then is changed to at least a second state, and then again is set to the first state;

setting means for the identifying means including means for setting the identifying means so that it identifies a plurality of corresponding pairs as being in the first condition when the second register means is again set to the first state, and means for setting the identifying means so that it identifies a corresponding pair as being in the second condition upon accumulating a word in the respective extension location; and means operable when the state of the second register means is changed in the course of said sequence for transferring words from selected extension locations to the corresponding memory locations if the identifying means identifies the selected corresponding pair as being in the second condition.

16. A data processing system comprising:

addressable memory means;

data processing means including a last-in first-out stack store which includes a plurality of memory locations in said memory means;

the last-in first-out stack store comprising: a plurality of extension storage locations, one for each of said plurality of memory locations;

occupied store indicator and copy store indicator for each extension location;

means for selectively storing information in the memory locations and the extension locations;

means for selectively setting an occupied store indicator to indicate storage of information in the corresponding extension location;

means for selectively setting a copy indicator to indicate information is stored in the corresponding memory location;

means responsive to the occupancy indication or lack thereof, respectively, for selectively obtaining information from the corresponding extension location or the corresponding memory location; and means responsive to the copy indicator for transferring information from extension locations to corresponding memory locations for which the copy indication is absent.

17. In a data processing system for executing a string of program operators forming a program having first and second blocks, having a program operator within the first block that orders entry into the second block and having a program operator within the second block that orders exit to the first block, the processing system including a first memory which has a plurality of locations and including a second memory which has a larger plurality of locations than the first memory but which has a longer access time, each memory for storing words which are accumulated during the execution of the program, a method for allocating the storage of the words between the locations of the first memory and the second memory, the method comprising the steps of:

a. accumulating in the first memory a plurality of words during the execution of the first block by push-down and pop-up operations; a push-down operation causing a word to be written into a location of the first memory and added to the total accumulated words; and a pop-up operation causing the word last written into the first memory by a push-down operation to be read out of the first memory and removed from the total of accumulated words; the accumulating step thereby forming an expanding and contracting stack wherein the location storing the last word pushed down and not yet popped up is the top location of the stack;

b. storing a pointer to said top location and updating the pointer as the stack expands and contracts;

c. marking the locations of the first memory containing the accumulated words to indicate such locations are occupied;

d. detecting the program operator ordering entry into the second block, and responsive to such detection transferring to the second memory the accumulated words for the first block;

e. accumulating in the first memory a plurality of words during the execution of the second block by push-down and pop-up operations and, meanwhile, repeating steps b and c; and f. detecting the program operator ordering an exit from the second block, and responsive to such detection 1. unmarking the marked locations of the first memory to indicate that they are unoccupied, and 2. setting the pointer to point to the location of the first memory which was the top location of the stack for the first block.

18. A data processing system comprising:

processing means including means for sequentially providing a plurality of information items to be accumulated as a stack and means for receiving information items retrieved from the stack;

an addressable memory;

a last-in, first-out store and store accessing means for transferring information items into and out of the store to accumulate the stack, the store comprising a multiplicity of memory locations in the memory and a plurality of extension locations;

settable means for identifying as currently reserved one of a plurality of groups of memory locations, each extension location corresponding to a different one of the reserved memory locations;

first setting means for setting the identifying means to sequentially select each of a plurality of groups with a first group and a second group being sequentially selected and subsequently the first plurality being re-selected copying means operable for transferring information items in either direction between corresponding memory and extension locations such that each information item transferred to an extension location by operation of the copying means is a copy of the information item in its corresponding memory location;

a plurality of indicators, each associated with a different extension location and having first, second, and third states, the first state indicating that there is stored in a memory location an information item of which there is not a copy in the corresponding extension location, the second state indicating that there is stored in a memory location an information item of which there is a copy in the corresponding extension location, and the third state indicating that there is stored in an extension location a new information item that is not a copy;

the store accessing means including means operative to store into each of a plurality of extension locations a respective one of a plurality of information items provided by the processing means while the first group is currently reserved;

means for setting to the third state each of the indicators associated with said each of a plurality of extension locations;

means for setting to the second state each of the indicators associated with extension locations to which an information item is transferred by operation of the copying means;

means responsive to the first setting means for setting indicators to the first state such that when the first group is reselected a plurality of extension locations are reserved for storing copies of information items thereby to at least temporarily postpone transfer of information items thereto; and the store accessing means including means for retrieving information items for the processing means with the retrieving means including means responsive to the indicators for accessing one of the extension locations if the associated indicator is in the second or third state and from the corresponding memory location if the associated indicator is in the first state.

* * * * *